United States Patent [19]
Citta et al.

[11] Patent Number: 5,111,287
[45] Date of Patent: * May 5, 1992

[54] TV SIGNAL TRANSMISSION SYSTEMS AND METHODS

[75] Inventors: Richard W. Citta, Oak Park; Ronald B. Lee, Chicago, both of Ill.

[73] Assignee: Zenith Electronics Corporation, Glenview, Ill.

[ * ] Notice: The portion of the term of this patent subsequent to Aug. 27, 2008 has been disclaimed.

[21] Appl. No.: 673,444

[22] Filed: Mar. 22, 1991

Related U.S. Application Data

[60] Division of Ser. No. 370,222, Jun. 22, 1989, Pat. No. 5,043,805, which is a continuation-in-part of Ser. No. 238,956, Aug. 31, 1988, which is a continuation-in-part of Ser. No. 176,893, Apr. 4, 1988, abandoned, and a continuation-in-part of Ser. No. 239,155, Aug. 31, 1988, abandoned.

[51] Int. Cl.⁵ .............................................. H04N 7/00
[52] U.S. Cl. ..................................... 358/83; 358/141
[58] Field of Search ............... 358/140, 141, 166, 167, 358/11, 12, 36, 37, 83, 186; 455/51

[56] References Cited

U.S. PATENT DOCUMENTS

| | | | |
|---|---|---|---|
| 2,458,124 | 1/1949 | Wilmotte | 358/83 |
| 2,644,942 | 7/1953 | Bedford | 358/186 |
| 4,216,496 | 8/1980 | Lothian et al. | 358/83 |
| 5,043,805 | 8/1991 | Citta et al. | 358/83 |

OTHER PUBLICATIONS

Benson, Television Engineering Handbook, McGraw-Hill Book Co. 1986, pp. 21.34–21.37, "Standards and Recommended Practices".

Lsrad et al., A Single Channel, NTSC Compatible Widescreen EDTV System, HDTV Colloquium Ottawa Canada, Oct. 1987.

McGrath, Synchronization of a Television Network with Precision Carrier Frequency Offset from a Reference Burst Inserted in the Video Blanking Period, International Broadcasting Convention, London, England, Sep. 1976, pp. 184–187.

Page, Minimizing Co-Channel Interference in Television Reception, Electronics, vol. 6, No. 15, Jul. 1970, pp. 454–455.

Rypkana, Spectrum and Interference Issues in ATV, IEEE Transactions on Consumer Electronics, vol. 35, No. 3, Aug. 1989, pp. 170–201.

*Primary Examiner*—James J. Groody
*Assistant Examiner*—Safet Metjahic

[57] ABSTRACT

A television system includes a plurality of complementary transmitter and receiver stages for processing an HDTV signal to minimize co-channel interference to and from NTSC signals, thereby facilitating the use of so-called "taboo" channels for the transmission of HDTV signals. The HDTV signals are encoded for transmission in a format exhibiting dominant periodicities equivalent to that of NTSC to further minimize such co-channel interference.

4 Claims, 27 Drawing Sheets

SIMULTANEOUSLY BROADCASTED WITH:

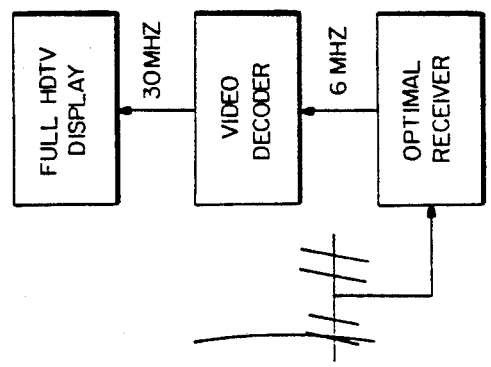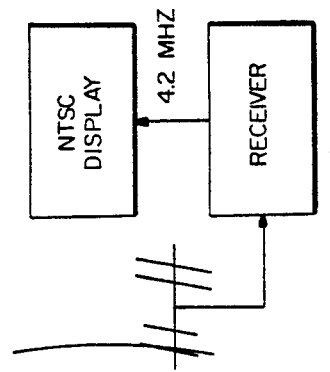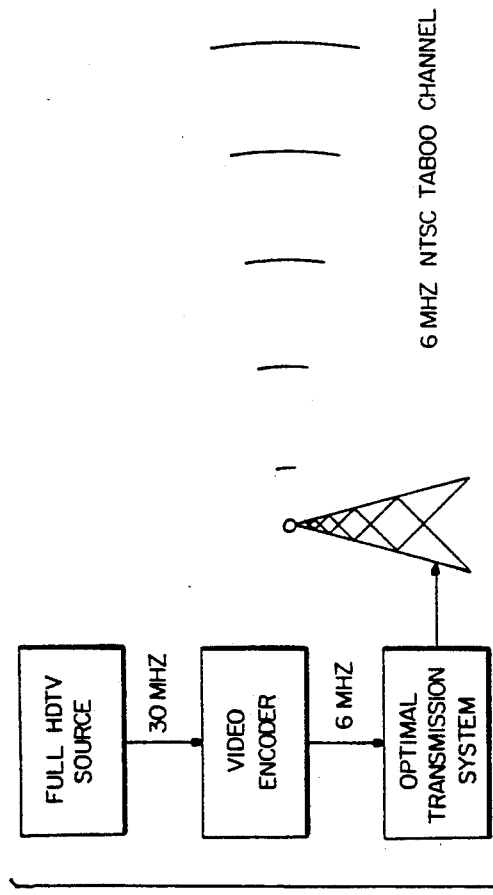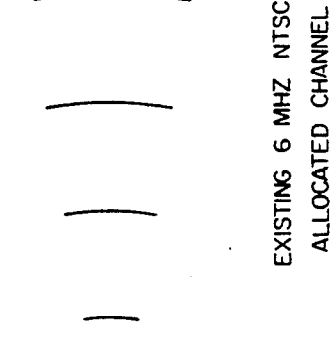
FIG. 1

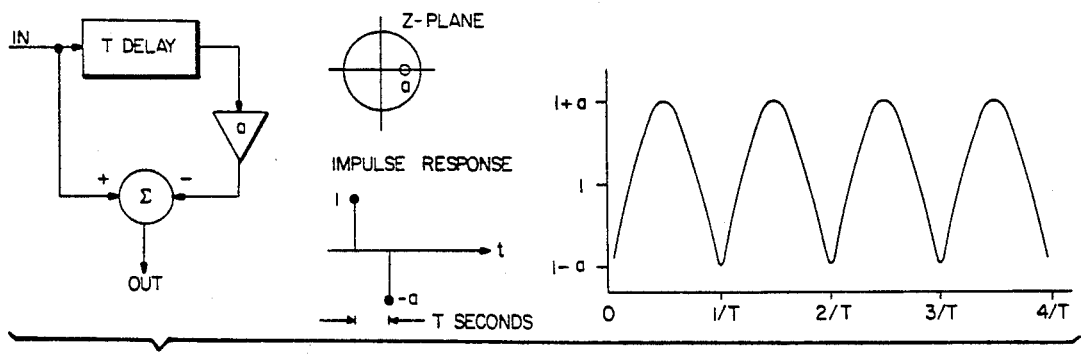
FIG. 17
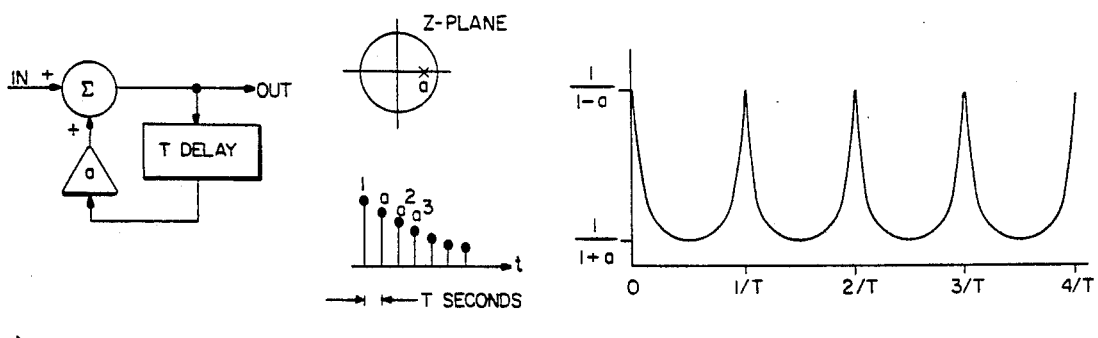
FIG. 18
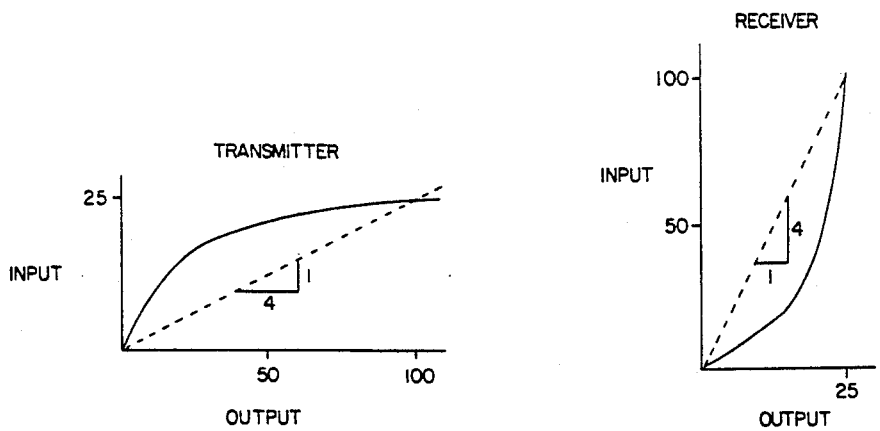
FIG. 19
FIG. 20

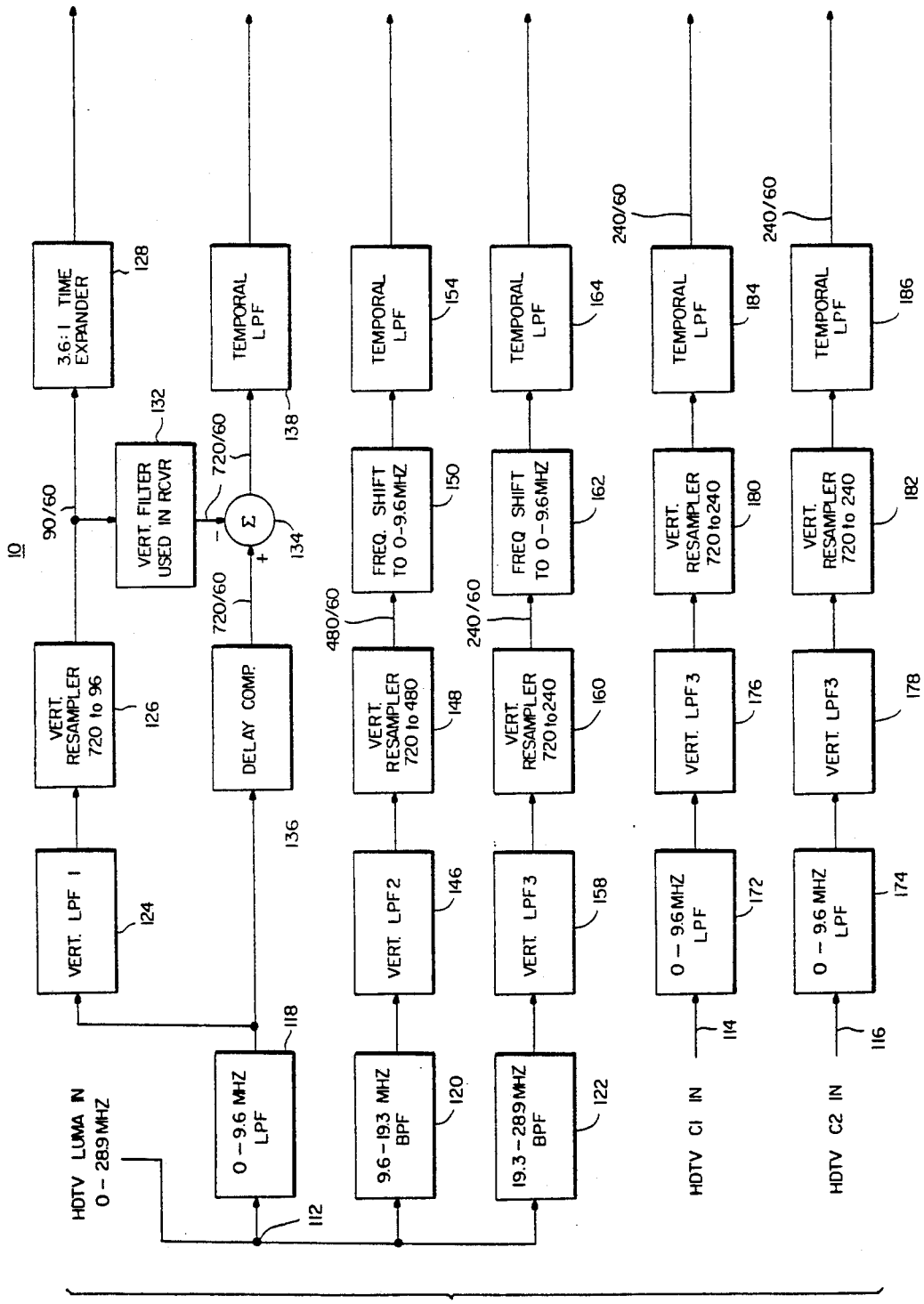
FIG. 21 (SHEET 1)

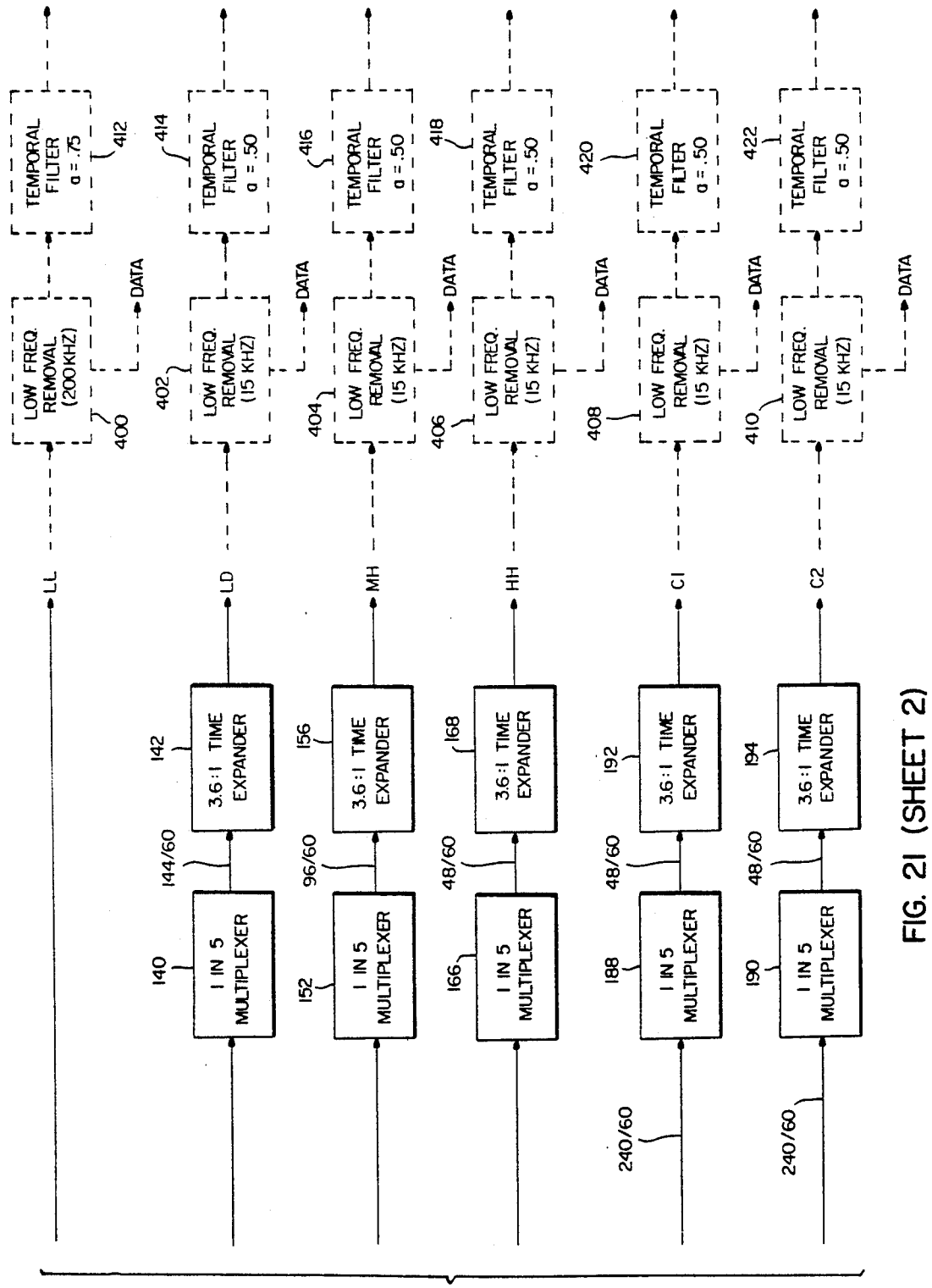
FIG. 21 (SHEET 2)

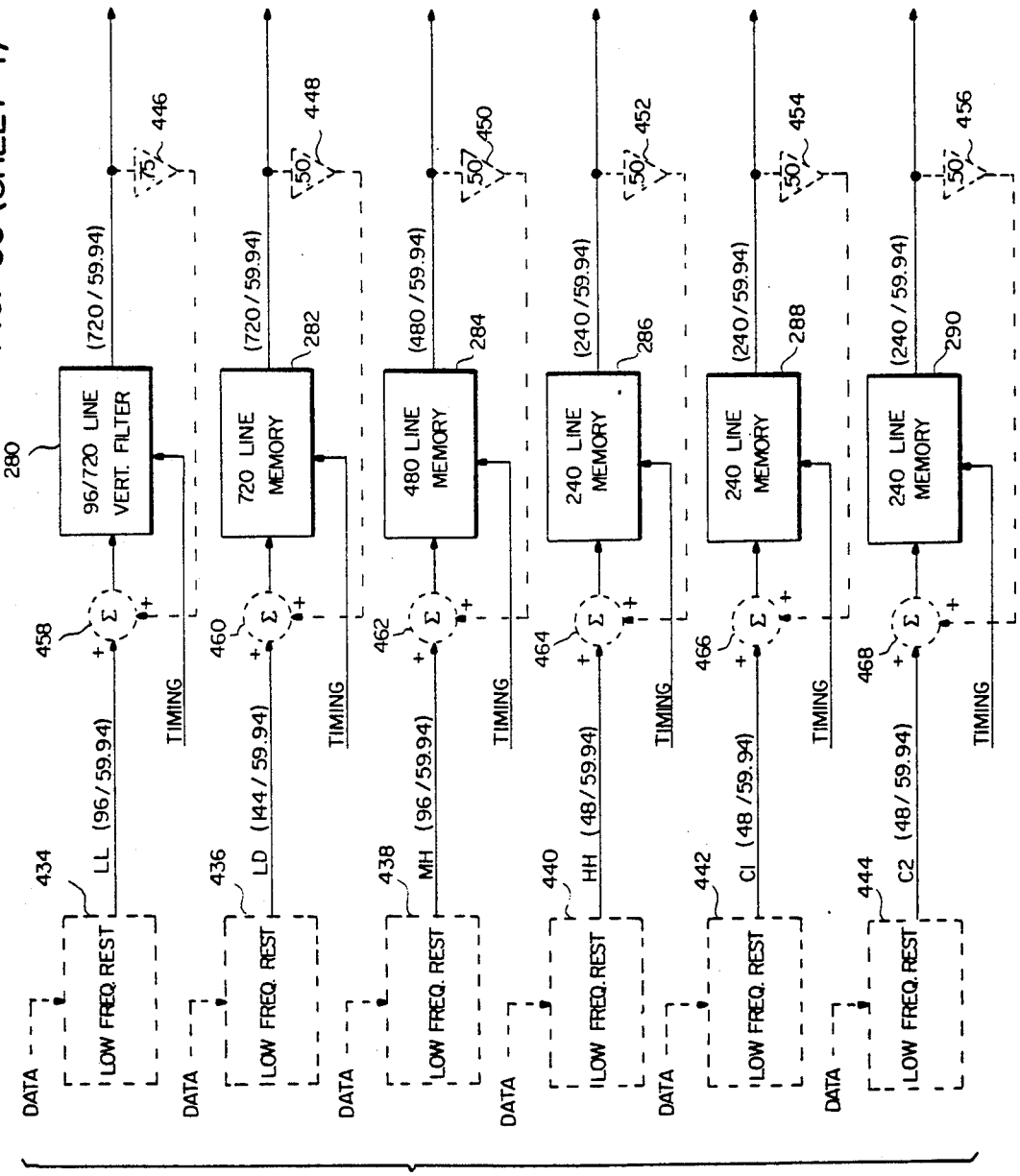
FIG. 30 (SHEET 1)

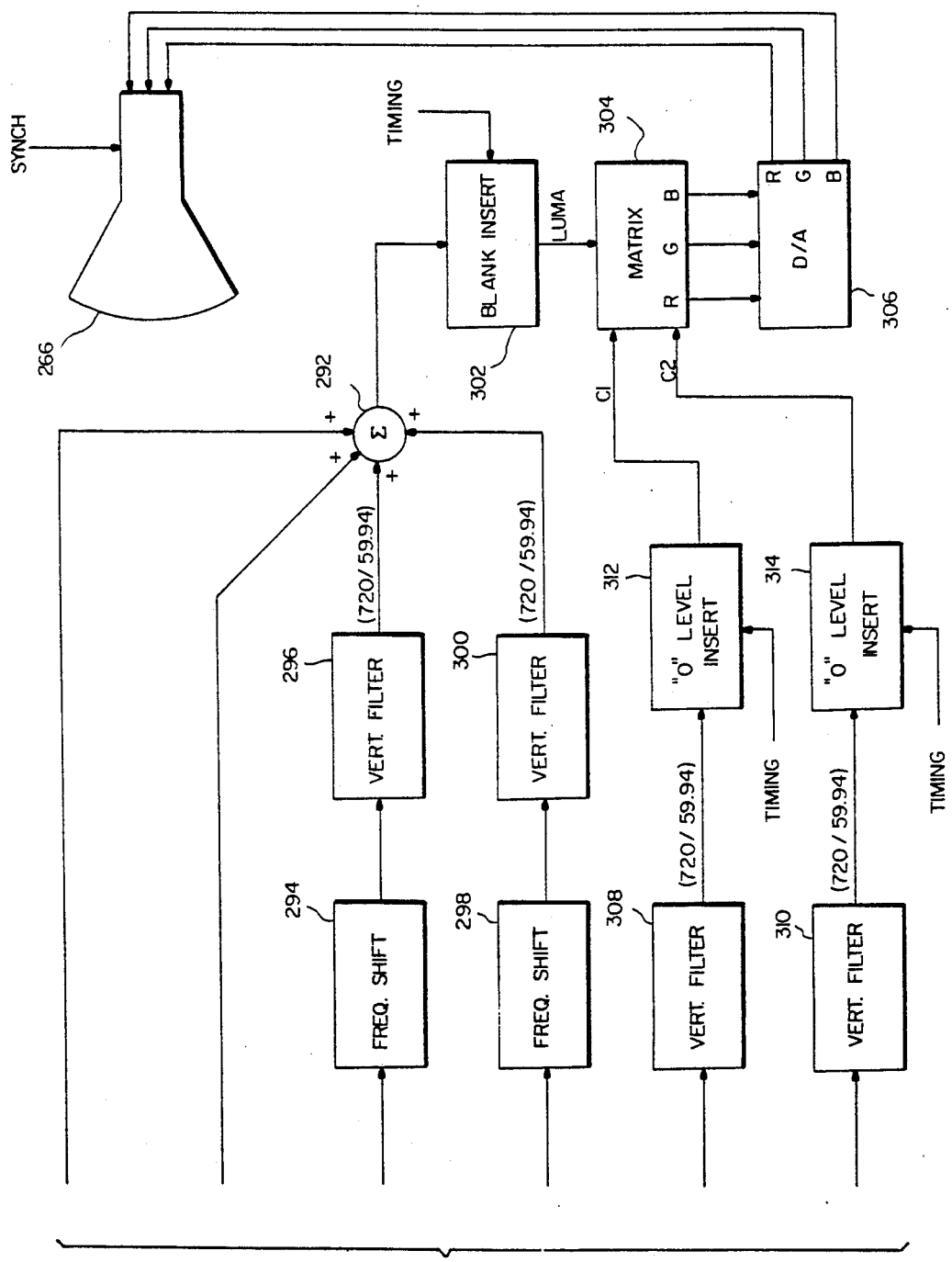
FIG. 30 (SHEET 2)

TV SIGNAL TRANSMISSION SYSTEMS AND METHODS

This application is a division of application Ser. No. 07/370,222, filed Jun. 22, 1989, U.S. Pat. No. 5,043,805, issued Aug. 27, 1991, which is a continuation-in-part of application Ser. No. 07/238,956, filed Aug. 31, 1988, which is a continuation-in-part of application Ser. No. 07/176,893, filed Apr. 4, 1988, abandoned, and a continuation-in-part of application Ser. No. 07/239,155, filed Aug. 31, 1988, now abandoned.

BACKGROUND OF THE INVENTION AND PRIOR ART

This invention relates generally to television signal transmission systems and methods and specifically concerns a novel spectrum compatible High Definition Television (HDTV) signal encoding and transmission system.

Recently, extensive interest has been generated in developing a so-called High Definition Television system having higher picture definition than existing television systems and improved audio. Such a system should also desirably exhibit improved noise performance and may have a wider aspect ratio. A difficulty is in the available spectrum space for terrestial broadcasting of television signals. It is desirable that HDTV television receivers be capable of receiving appropriate video and sound signals while the existing population of NTSC receivers continue to receive their accustomed NTSC performance without perceptible impairment.

The proposed HDTV systems may generally be categorized into three groups; compatible systems, augmentation systems and non-compatible systems. Compatible systems add to or modify an existing NTSC transmission in a manner so that it may still be viewed on an existing receiver with NTSC resolution, but may be received with higher resolution on a special HDTV receiver. The compatible transmission is normally limited to the same 6 MHz channel used for NTSC transmissions. Augmentation systems, on the other hand, transmit augmenting signals in additional spectrum space without disturbing the NTSC transmission. Thus, an existing receiver may reproduce the televised image with NTSC resolution by tuning the standard channel, while a special HDTV receiver may be used to tune both the standard channel and the augmenting signals to reproduce an HDTV image. Transmissions comprising various combinations of these two techniques are also possible.

It is believed that a non-compatible system will provide the best solution to the problem of providing high quality HDTV. Compatible systems have the disadvantage of almost inevitably producing undesired artifacts in standard NTSC receivers. Augmentation systems have the disadvantage that multiple RF bands must be tuned and that different signals must be precisely pieced together to form the HDTV image. Non-compatible systems provide HDTV transmissions which cannot be received by standard NTSC receivers. Since such transmissions must be made over unused spectrum, care must be exercised to avoid interference with existing NTSC channels. Co-channel and adjacent channel interference are of particular concern in this regard.

With respect to spectrum availability, it is well known that many of the designated television signal channels are not used in a particular geographical area. This is due to the impossibility of adding new transmitted signals in the unassigned positions of the spectrum because of a large number of FCC mandated prohibitions (particularly in the UHF band), colloquially referred to as "taboos." In most metropolitan areas, spectrum utilization is restricted to every second VHF channel and every sixth UHF channel. It will be seen that with the transmission system of the invention, the transmission format is changed (with corresponding changes in receiver requirements) to enable more efficient utilization of the existing VHF/UHF spectrum. With the invention, every existing NTSC broadcast station will be capable of obtaining a second 6 MHz channel over which an HDTV signal can be broadcast simultaneously with the existing NTSC program. Thus with the system of the invention, a spectrum compatible system with existing NTSC signals is obtained.

The preferred embodiment of the invention provides special benefits with regard to adjacent channel and co-channel interference problems with NTSC and other type television signal transmission and receiving systems. The improved transmission system permits operation in or adjacent to NTSC television signal transmission areas without objectionable adjacent channel and co-channel interference, either into or from the NTSC channel.

An NTSC television signal occupies a 6 MHz bandwidth and imposes significant transmission power demands. These power demands are directly related to the cost of operating the signal transmitter and reductions therein can yield significant economic benefit. Also of great importance is the fact that cable television plants, especially those of older vintage, are restricted in the number of channels they can handle by the signal power handling capabilities of their amplifiers. It would be highly desirable to reduce the amount of signal power required to transmit television signals, thereby reducing transmitter operating costs and permitting a larger number of television channel signals to be handled by a cable plant of given power handling capability. The system of the invention achieves a marked reduction in the power required to transmit an AM television signal without discernible degradation of signal fidelity and therefore provides a solution to these needs of the prior art.

In its FM implementation, the system of the invention enables transmission with significantly less bandwidth since the deviation of the FM signal is minimized, which will find ready application in Direct Broadcast Satellite (DBS) transmission systems. The smaller bandwidth directly improves the signal to noise performance of the system, which improvement may be translated into smaller receiving antennas. Thus, the system of the invention will be seen to solve a longstanding problem in DBS transmission systems.

The inventive transmission system has a number of important aspects. In accordance with a fundamental aspect thereof, a television signal is configured such that the transmitted signal is a "hybrid," that is; it has a coded (digital) portion representing signal components of low picture detail and relatively high transmission power demand that may be transmitted in a relatively low power utilization format; and an analog portion, representing signal components of high picture detail and relatively low transmission power demand. The demarcation between the analog and digital portions is a function in part of the availability of means to transmit the digital data. In accordance with the invention, the data is sent in non-active video portions of the transmitted signal.

The hybrid system is subdivided into a "basic hybrid," in which the removed and digitized low frequencies are under about 15 KHz and an "extended hybrid" in which the removed and digitized signal frequencies are under about 200 KHz. As will be explained in detail below, in the basic hybrid form of the invention, the digital part comprises video components below the line deflection frequency that are digitally coded and transmitted as data during non-active video portions of the television signal. In the extended hybrid form of the invention, the digital part comprises video components below about 200 KHz that are digitally coded and transmitted as data during non-active video portions of the television signal. Since the invention may be used with many different television signal formats, the non-active video portions of the signal may include either or both the horizontal and vertical blanking intervals.

It has also been found that further benefits are obtained by sequentially applying basic hybrid processing and extended hybrid processing (referred to as two step processing), with the basic hybrid processing being performed for the active video of each horizontal line such that the low frequency average of each horizontal line is removed from the analog signal. The remaining components below 200 KHz are subsequently removed.

A further aspect of the inventive system involves "temporal pre-emphasis," also referred to as temporal filtering, field processing or frame combing. With this approach, transmission power for stationary images is reduced while transmission power for moving images is increased. Since the average television picture is, relatively speaking, static, the use of temporal pre-emphasis is of benefit because the greater interference potential of signals corresponding to moving images is outweighed by the fact that noise in a moving image is much less noticeable than noise in a stationary image. Temporal de-emphasis is applied in the receiver. This aspect of the invention has advantages in any "video" transmission system independent of the hybrid processing of the signal. This is due to the fact that normally there is little change between successive frames of video and emphasizing the changes relative to the static portions results in very efficient transmission.

Yet another aspect of the inventive system involves compressing the "hybrid" video signal to achieve a large signal to noise ratio for broad, flat video areas, where noise is readily discernible, and a low signal to noise ratio for narrow video components, representing edges and video detail, in which noise is much less discernible. In the receiver, the signal is expanded to undo the compression in the transmitter. The combination of compression and expansion is referred to as "companding."

Still another important feature of the inventive system is the use of dispersal filtering to reduce the amplitudes of the peak video components by distributing their energy among the voids created in the hybrid video signal. As will be seen, these voids are the direct result of hybrid processing of the video signal whereby low frequency analog components are removed, coded and included as data in the non-active video portions of the remaining analog high frequency components.

As those skilled in the art will readily perceive, reduction of the average power of the transmitted signal is highly desirable, especially where adjacent channel and co-channel interferences are concerned. The reduction occurs because of the hybrid processing of the video signal which effectively replaces low frequency video signals with "doublets" that define the edges of the video image. With temporal filtering, the largest signals result from moving video edges which can be compressed even more. Companding increases the signal to noise performance for relatively stationary edges of video images at the expense of much less observable noise associated with moving video image edges. Dispersal filtering primarily reduces the amplitudes of the signals above the hybrid processing frequency range.

Other advantages flow from application of the various aspects of the inventive transmission system that improve signal to noise performance, especially with respect to the ability to operate in an environment of adjacent and co-channel NTSC signals. These include; the technique of precise carrier frequency offset with respect to co-channel NTSC signals to cause "break up" of interfering signals and thereby reduce their visibility in the video display; and co-location (locating the hybrid signal transmitter of the invention close to the adjacent channel NTSC transmitter) to assure that receivers in both reception areas receive approximately equal strength signals to enable their respective AGC systems to set up properly. Also frame locking the hybrid signal to the NTSC signal and incorporating all data in the vertical blanking interval of the hybrid signal contributes to the ability to operate in a co-channel environment. It will, of course, be clear that the many aspects of the inventive system may have benefits that are independent of other aspects of the system, and that the use of one or more of the aspects in combination with each other produces even greater benefits.

The encoding format used in the HDTV system of the present invention has substantially improved resolution relative to the current NTSC system. While being non-compatible with NTSC, it affords a viable solution to the search for a high quality HDTV system that will not obsolete the existing population of NTSC receivers. The encoding format further minimizes adjacent channel and co-channel interference problems by exhibiting dominant timing periodicities equal to those characteristic of an indigenous television system, such as NTSC in the United States.

While the techniques of the invention may be used with non-compatible, as well as augmentation-type HDTV systems to allow maximum utilization of existing spectrum, they are of particular benefit when used with Zenith Electronics Corporation's Spectrum Compatible High Definition Television System presently under consideration.

OBJECTS OF THE INVENTION

A principal object of the invention is to provide novel television signal transmission systems and methods.

An additional object of the invention is to provide television signal transmission systems of improved noise performance.

A further object of the invention is to provide a novel AM television signal transmission system that requires substantially less transmitting power.

A still further object of the invention is to provide a novel FM television signal transmission system that requires substantially less bandwidth.

Another object of the invention is to provide a television transmission system that minimizes adjacent channel and co-channel interference.

Still another object of the invention is to provide an optimal television signal transmission system with better noise performance.

A basic object of the present invention to provide an improved HDTV system.

It is a further basic object of the invention to provide an improved HDTV system of the non-compatible type.

It is another basic object of the invention to provide an HDTV System in which the HDTV transmissions are made over a standard 6 MHz television channel in a manner so as to minimize interference with existing NTSC transmissions.

It is yet another basic object of the invention to provide an improved HDTV system in which an image is transmitted and reproduced in a manner matching the visual performance of the human eye.

BRIEF DESCRIPTION OF THE DRAWINGS

These and other objects and advantages of the invention will be apparent upon reading the following description in conjunction with the drawings, in which:

FIG. 1 is a diagram illustrating a spectrum compatible HDTV system operating in a taboo NTSC channel;

FIG. 17 illustrates a temporal pre-emphasis filter and its response as used in the transmitter of FIG. 16;

FIG. 18 illustrates a temporal de-emphasis filter and its response as used in the receiver of FIG. 16;

FIG. 19 is the response characteristic of the compressor in the transmitter of FIG. 16;

FIG. 20 is the response characteristic of the expander in the receiver of FIG. 16;

FIG. 21 is a block diagram of an encoder for encoding an HDTV transmission according to the invention;

FIGS. 29 and 30 are block diagrams illustrating a receiver for receiving, decoding and displaying an HDTV video image according to the invention.

DESCRIPTION OF THE PREFERRED EMBODIMENTS

Figure 1A:
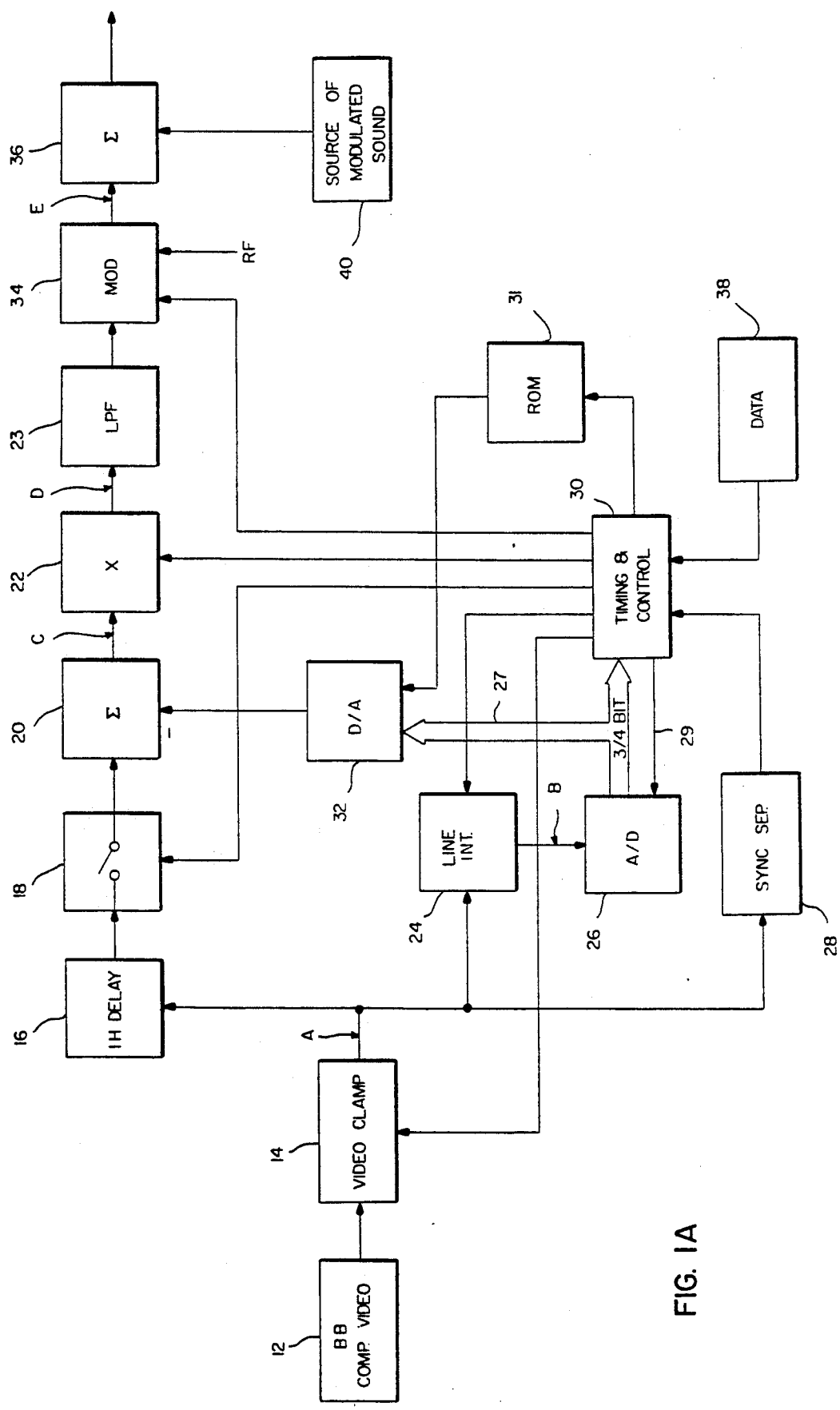
FIG. 1A is a block diagram of a basic hybrid television signal transmitter constructed in accordance with the invention.

In the diagram of FIG. 1, a spectrum compatible HDTV system is illustrated using an NTSC taboo channel. The full HDTV source is a 30 MHz video signal that is encoded to conform to a 6 MHz channel (the HDTV format aspect of the invention) and transmitted over an optimal transmission system (the transmission aspect of the invention) in a 6 MHz NTSC taboo channel. An HDTV receiver (including a receiver, a video decoder and a display) is also shown as well as a conventional NTSC transmitter and receiver. The ability to transmit a wide-band HDTV signal over a 6 MHz NTSC taboo channel results from using the novel HDTV format with the novel transmitting system, each of which is separately described and claimed in the above-mentioned respective copending applications.

TRANSMISSION SYSTEM

The primary function of the transmission system of the invention is to provide for the transmission of a wide-band HDTV signal over a 6 MHz NTSC taboo channel without causing adjacent or co-channel interference with existing NTSC (or other indigenous) transmissions. According to one aspect of the invention, a hybrid transmission system is provided to facilitate these results.

The philosophy of the hybrid processing of the invention is to reduce to power required to transmit a television signal by extracting low frequency video analog components therefrom (that have a high transmission power requirement) and transmitting such components in a coded, low-power-consumption form along with the remaining high frequency components that are transmitted in a conventional manner. As will be discussed, this results in a substantial reduction in transmitter power reducing the likelihood of interference into an existing NTSC channel. The power reduction may also be translated into better low frequency noise peformance since the transmission power demand is greatest for the low frequency components. In FM transmissions, the benefit is in the form of reduced bandwidth which also improves noise performance. Hence the hybrid television signal transmission systems of the invention have improved noise performance over prior art television systems.

More specifically, in the basic hybrid form of the invention, the baseband composite video signal is subjected to "line integration" at the transmitter to determine a line averaged value of the active video for each horizontal line. In an analog version of the transmitter, the line averaged value is passed through an analog-to-digital (A/D) converter where it is converted to a digital value which is coded and transmitted with the high frequency components of the video signal. These high frequency components are obtained by subtracting an analog signal that corresponds to the line averaged digital value of the active video portion of each horizontal line. To assure that the subtracted analog signal corresponds to the appropriate portions of the baseband video signal, the baseband composite video signal is subjected to a one horizontal line delay. The output of the line integrator may be subtracted directly from the baseband video signal to obtain the high frequency components. This approach could introduce error since the coded representation of that signal, which is used in the receiver to reconstitute the low frequency components, may have resolution limitations. Preferably, digital values, representing the line averaged video signals, are supplied to a digital-to-analog (D/A) converter for developing the analog signals (low frequency components), which are subtracted from the baseband video signal. This eliminates error due to resolution limitations. Accurate reconstruction of the low frequency portions can now be accomplished in the receiver because each coded representation truly represents the substracted low frequency portions for that video line. In a digital version of the transmitter, the analog video signal is converted to a digital signal and a digital average of the active video portion of each horizontal line is obtained.

As will be seen with reference to the extended hybrid form of the invention, frequencies below about 200 KHz are removed and sent as coded data for even greater power reduction benefits and to yield further co-channel interference benefits from temporal pre-emphasis signal compression and dispersal.

Referring in greater detail to the drawings, in FIG. 1A, a source 12 of baseband composite video signal supplies a video clamp circuit 14 in accordance with conventional techniques for establishing a base line reference, generally at blank level, i.e., corresponding to the level of the sync signal back porch. The output of video clamp 14 is supplied to a one horizontal line (1H) delay circuit 16, to a line integrator 24 and to a conventional sync separator circuit 28. The output of sync separator circuit 28 supplies sync pulses to a timing and control circuit 30. A data source 38 supplies information, in the form of data to be included in the transmitted television signal, to timing and control circuit 30. The delayed baseband composite video signal output from delay circuit 16 is passed through a switch 18 that is operated by timing and control circuit 30. The output of switch 18 is supplied to a summing network 20 which, in turn, supplies a multiplier circuit 22. Line integrator 24 is also coupled to, and operated under the control of, timing and control circuit 30 for integrating only the active video portion of each horizontal line of the baseband composite video signal. Its output is supplied to an A/D converter 26 which is coupled over a communication bus 27 to timing and control circuit 30. Communication bus 27 is also coupled to a digital-to-analog (D/A) converter 32. A control line 29 links A/D converter 26 and timing and control circuit 30. A ROM 31 is coupled between timing and control circuit 30 and D/A converter 32. ROM 31 supplies certain fixed reference and identification signals to D/A converter 32 as will be explained.

The output of multiplier 22 is coupled to a low pass filter (LPF) 23 to conform the data pulses to channel bandwidth limitations. LPF 23 feeds a modulator 34 which, along with multiplier 22, is under control of timing and control circuit 30. Modulator 34 is also supplied with an RF carrier and, in turn, supplies a summing network 36 that combines an audio signal from a source of modulated sound 40 with the modulated video signal of the invention for transmission to suitable receivers. Modulator 34 may either be an AM or FM modulator, with the FIG. 1A implementation being for the AM version. For an FM version, sound source 40 need only be interposed between LPF 23 and modulator 34.

In operation, timing and control circuit 30, under control of the sync signals from sync separator 28, sends appropriate timing signals to video clamp 14, line integrator 24, switch 18, multiplier 22, modulator 34, A/D converter 26, D/A converter 32 and ROM 31. The video clamp 14 maintains the sync signal back porch of the composite baseband video signal at a predetermined level. The line integrator 24 is operated to independently integrate only the active video signal portion of each horizontal line. Switch 18 is operated by timing and control circuit 30 to pass active video and color burst, but not horizontal sync, if present, to summing circuit 20. The line average value of video developed by line integrator 24 for a particular video line is digitized by A/D converter 26 and coupled to both timing and control circuit 30 and D/A converter 32. D/A 32 converts the ouput of A/D 26 to a corresponding analog signal which is subtracted from active video in summing network 20. During the horizontal sync signal portion of the composite video signal, ROM 31, in response to timing and control circuit 30, couples a digital pedestal signal to D/A 32, which is converted to a corresponding analog pedestal signal and inserted into the signal developed in summing network 20. It will be appreciated that some video signal formats may not have horizontal syncs or blanking intervals between successive horizontal lines.

Timing and control circuit 30 develops a data signal comprising positive and negative voltage data pulses representing the digitized line averaged signals from A/D 26 and applies these data pulses, during the horizontal blanking intervals, to multiplier 22. Multiplier 22 multipliers these data pulses with the analog pedestal signal previously inserted in the horizontal blanking interval to develop positive and negative data pulses during the horizontal blanking interval of the signal. As will be discussed below, the resultant coded representations of the line average signals are used to reconstitute the signal in the receiver.

While the number of data pulses that may be inserted in the horizontal blanking interval is dependent upon the data frequency, the inventive system envisions that other coded data may be included in the horizontal blanking interval if desired, specifically data from data source 38. While the coded representation of the digital output of A/D converter 26 for each video line preferably comprises three or four bits ($\frac{3}{4}$), more bits can be used depending upon the resolution desired. To assure accuracy of the reconstituted signal in the receiver, this line varying ¾ bit digital signal, which represents high (transmission) energy, low frequency components of the video signal, is passed through D/A converter 32 to form an analog signal that is subtracted from the composite baseband video signal. Due to the resolution limitations of the ¾ bit signal, a small residue of low frequency components may remain in the analog video signal that is passed by summing network 20 to mulitplier 22. However, since the low frequency video component added to the high frequency video component in the receiver is derived from the same ¾ bit signal, it will precisely match that which was subtracted at the trasmitter.

Figure 2:
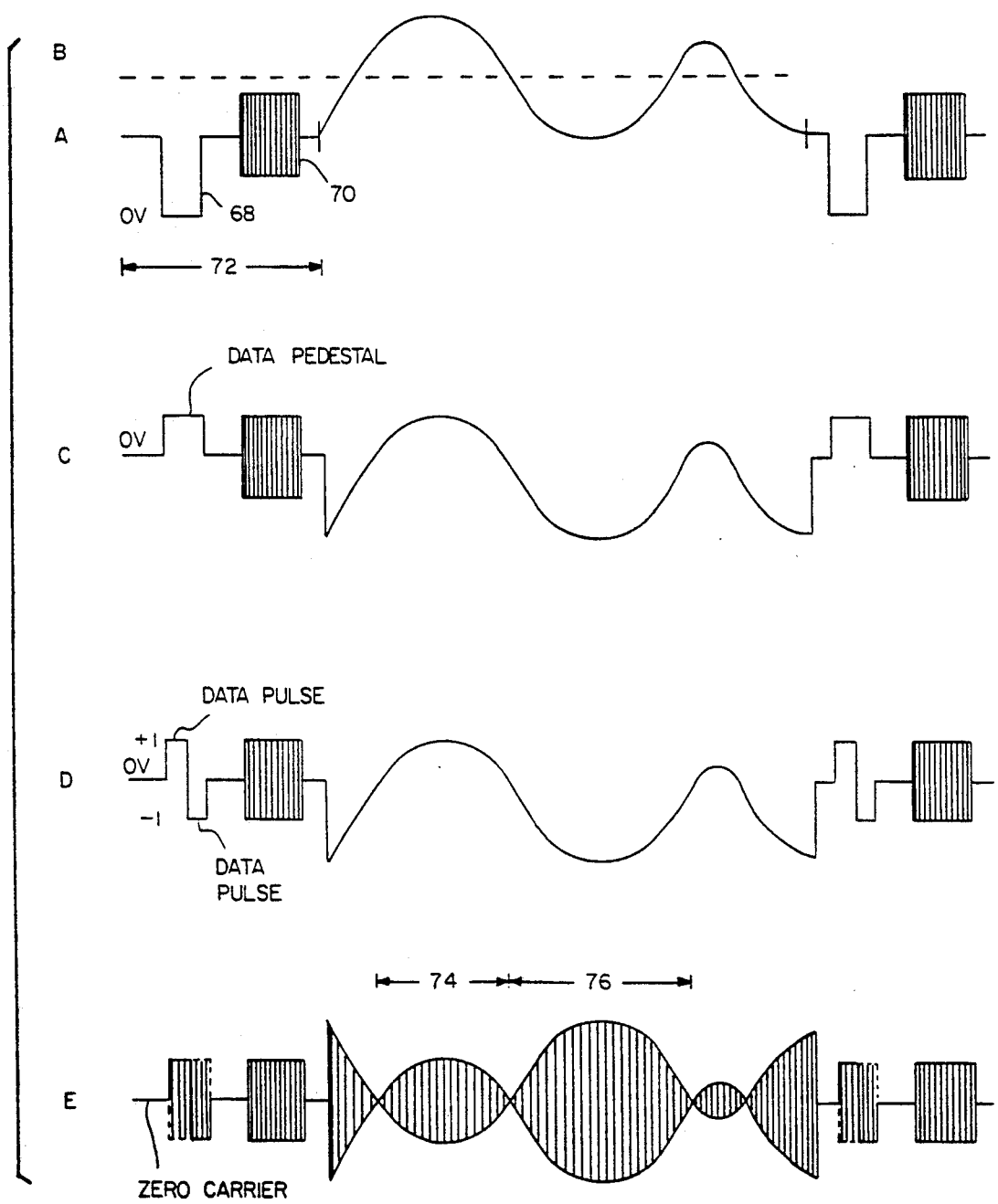
FIG. 2 is a series of waveforms useful in explaining the invention illustrated in FIG. 1A.

In FIG. 2, the series of idealized, not-to-scale waveforms labelled A, B, C, D and E correpsond to those appearing at correspondingly labelled portions of FIG. 1A. Waveform A represents the baseband composite video signal with negative-going 15.75 KHz horizontal sync pulses 68, a 3.58 MHz color burst 70 and a horizontal blanking interval 72, Waveform B is indicated as a dashed horizontal straight line and represents the output of line integrator 24 which corresponds to the average level of the active video signal between successive horizontal blanking intervals 72. Waveform C rerpresents the result of the subtraction of the line averaged video from the composite video signal and is centered at zero volts. It also includes the data pedestal added in summing network 20. Waveform D illustrates the result of multiplier 22 multiplying data with the data pedestal to develop positive and negative data pulses during the horizontal blanking period. While only two such pulses are shown for simplicity, a greater number of pulses is contemplated. Modulator 34 modulates an RF television frequency carrier with the bandwidth limited video signal, including the data pulses, for transmission as illustrated by waveform E. The signal is centered about zero carrier and reverses phase each time the envelope passes through the zero carrier level. Thus, for example, each half cycle of the color burst, as well as each data pulse, reverses phase. Portions 74 and 76 of the waveform represent RF carrier phase reversals in the video signal.

Figure 3:
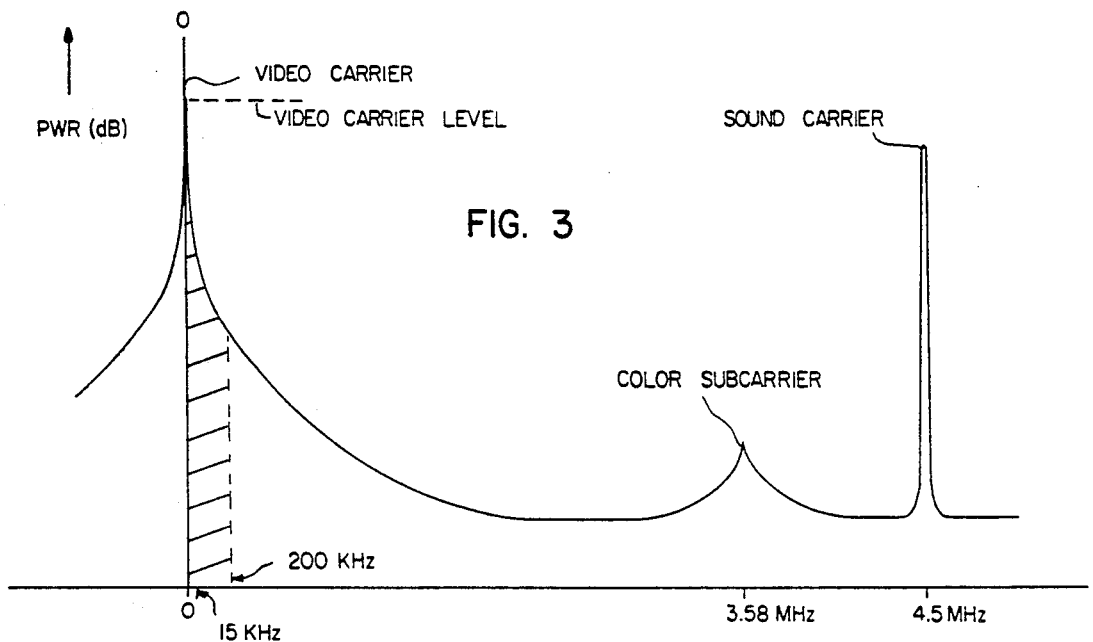
FIGS. 3 and 4 are graphs of power distribution of a typical AM modulated television signal.
Figure 4:
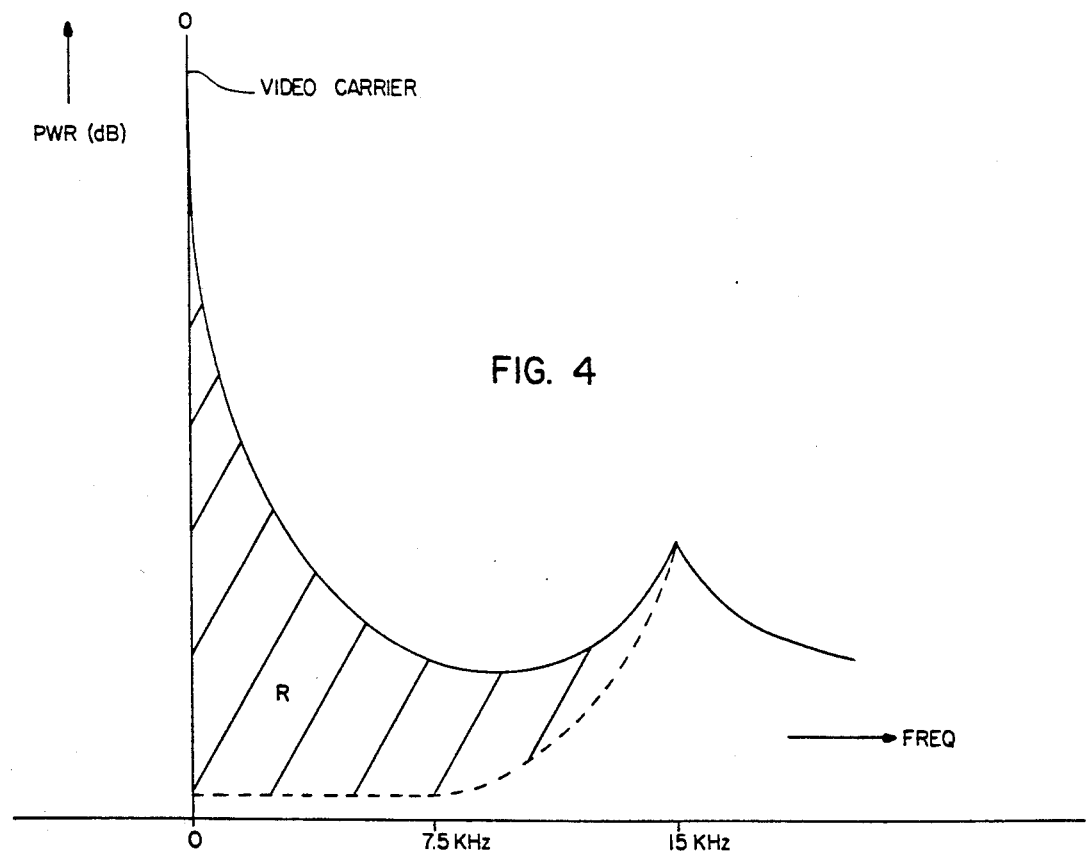

Referring to FIG. 3, an idealized representative spectrum of power distribution of an NTSC type television signal indicates the very significant power demand on the transmitter near the carrier frequency. FIG. 4 shows a very greatly expanded portion of the curve of FIG. 3 near the video carrier frequency. In particular the portion of the spectrum between the video carrier frequency and 15 KHz is illustrated. The shaded area bounded by the waveform and the dashed line illustrates pictorially the power saved with the basic hybrid form of the invention because of the subtraction of the low frequency signal components (below 15 KHz) from the transmitted signal. These low frequency components are instead transmitted in the form of data in a coded low-energy utilization format as explained above. This shaded area is estimated to represent approximately 99% of the power of a typical television signal. A reproduction in transmitted power of 20 dB (100:1) is thus well within that contemplated by the invention. Some of this power reduction may, of course, be sacrificed as a tradeoff to improve the signal-to-noise ratio of the transmitted signal. It should be borne in mind that since the power scales of the curves are logarithmic, they do not graphically convey the true magnitude of power reduction obtained with the invention.

A shaded area between 0 and 200 KHz on FIG. 3 will be discussed later in connection with the extended hybrid form of the invention in which analog components up to about 200 KHz are removed. While the additional transmission power savings from removing components below 200 KHz is not nearly of the magnitude as with the basic hybrid, the benefits obtained in compressing and dispersal of the peak video signals produced are very significant. It should also be pointed out that the coded data need not be put in the horizontal intervals of the transmitted signal, but may advantageously be transmitted in the vertical blanking intervals of the transmitted television signal. Indeed, as fully disclosed in the copending application above, the transmitted video signal need not have horizontal blanking intervals, or even horizontal sync. In general, the data may be placed in any non-active video portion of the television signal for optimum noise preformance.

Figure 5:
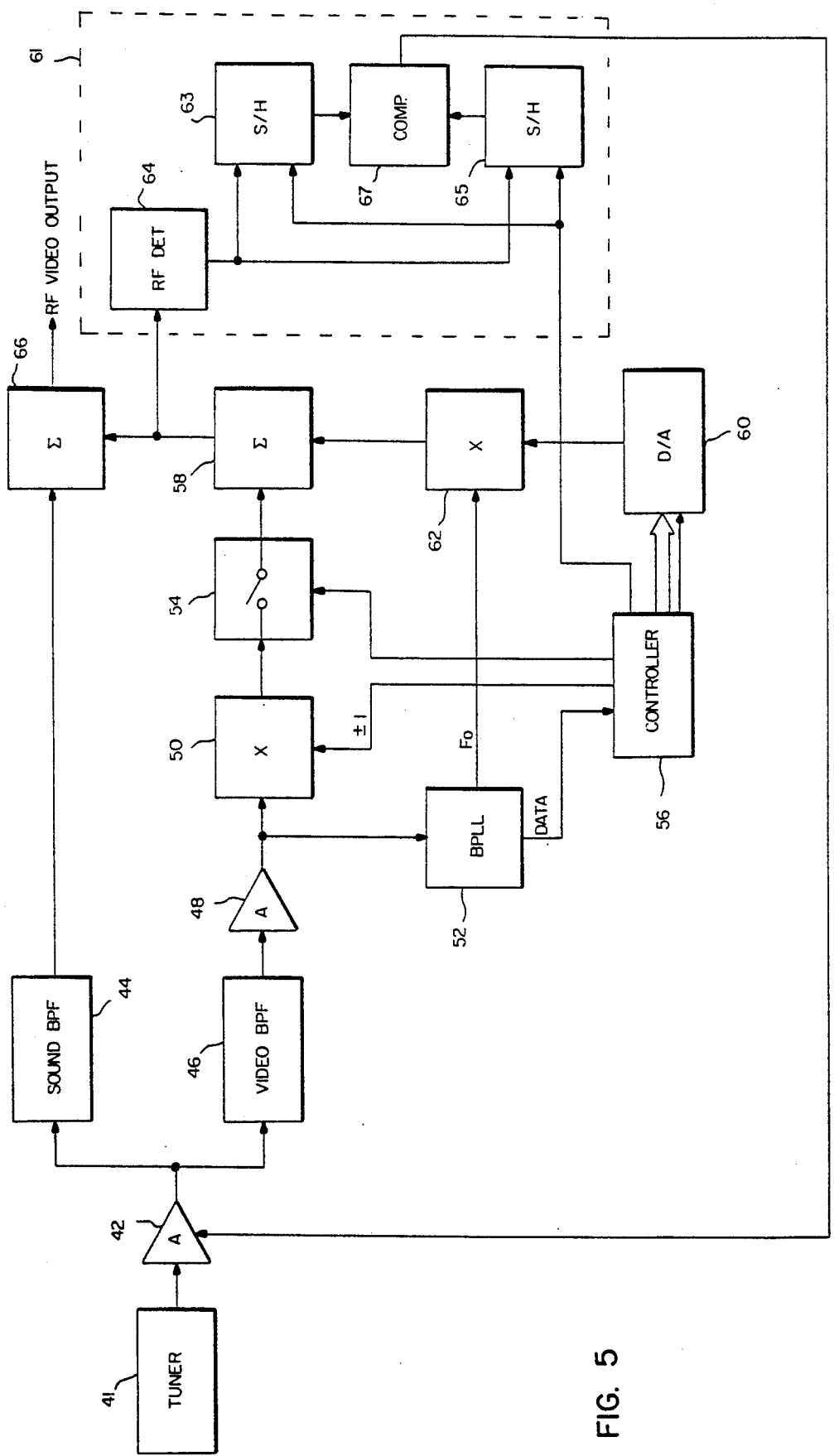
FIG. 5 is a block diagram of a basic hybrid television receiver constructed in accordance with the invention and operating at RF frequencies.

In the receiver of FIG. 5, the basic hybrid form of transmitted signal is received by a tuner 41 and supplied to a buffer amplifier 42. The output of amplifier 42 supplies a sound carrier bandpass filter 44 and a video carrier bandpass filter 46. The receiver operates at RF frequencies, although operation at IF and baseband frequencies are also contemplated. The output of sound bandpass filter 44 is supplied to one input of a summing network 66. The output of video bandpass filter 46 is supplied to a buffer amplifier 48. Buffer amplifier 48 feeds a multiplier 50 and a biphase stable phase locked loop (BPLL) circuit 52. The output of multiplier 50 is supplied through a switch 54 to a summing network 58. The data ouput of BPLL 52 is supplied to a controller 56 which, in turn, controls operation of multiplier 50 and switch 54. Controller 56 also supplies data, including the coded representation of the line averaged video, to a D/A converter 60. In the preferred embodiment, BPLL 52 is biphase stable and operates to provide recovered data, including the coded representation of line average video, to controller 56 and a fixed amplitude carrier Fo, that is either in phase or 180° out of phase with the received signal, to a multiplier 62. BPLL 52 may advantageously be constructed in accordance with the teachings of Ser. No. 025,240, filed Mar. 12, 1987, entitled COMBINED FPLL AND PSK DATA DETECTOR, in the names of R. Citta and G. Sgrignoli, and assigned to Zenith Electronics Corporation. That application cites U.S. Pat. Nos. 4,072,909, issued Feb. 2, 1978, and 4,091,410, issued May 23, 1978, both in the name of R. Citta, as examples of biphase stable loops. The copending application and the mentioned patents are incorporated herein by reference.

The received signal at the output of amplifier 48 is either in phase with, or 180° out of phase with, Fo. A special identification signal, (to be discussed in further detail hereinafter) inserted at the encoder by ROM 31 (FIG. 1A) into the vertical interval of the television signal, is also recovered as part of the data and is interpreted by the controller to determine whether the phase of the received signal should be reversed to establish the correct phase relationship. Multiplier 50, under control of controller 56, multiplies the signal at the output of amplifier 48 by either +1 or −1 to assure the correct phase relationship with Fo. Those skilled in the art will recognize that, alternatively, the phase of Fo may be controlled by appropriate multiplication rather than by controlling the phase of the received signal as described. In either case, after any necessary corrections, Fo and the received signal will have the same phase. It will of course be appreciated by those skilled in the art that any other well-known technique may be used in place of that discussed for determining the correct phase of Fo.

Controller 56 develops a number of clock or timing signals from the received color burst in a well-known manner. It will be recalled that the color burst of the encoded signal changes RF carrier phase every half cycle thereby providing a conveniently detectable timing reference. These signals include a high frequency clock locked to the color burst and a horizontal rate clock derived by counting down therefrom. A low frequency clock is developed from an identification signal, to be described. Data is removed from the incoming signal by opening switch 54 during time periods corresponding to the occurrence of data. Sync information, i.e., a sync pulse and pedestal, is regenerated in the controller and applied via D/A 60 and multiplier 62 to summing network 58.

Multiplier 62 multiplies Fo with the output of D/A converter 60 to produce a carrier signal, the amplitude of which is determined by the coded representation of the line averaged low frequency video, for addition to the received video signal supplied to summing network 58. The output of summing network 58 is therefore the reconstituted video portion of the television signal. This signal is supplied to a special AGC circuit 61 and to summing network 66 where it is recombined with the sound modulated carrier and passed to conventional television signal processing circuitry (not shown). The output of AGC circuit 61 controls the gain of amplifier 42 to assure that the analog value of the digital representation of the line averaged video at the receiver matches that in the transmitter since the digital data is not altered by transmission attenuation as are analog portions of the signal.

The special AGC circuit 61 includes an RF detector 64, a pair of sample and hold (S/H) circuits 63 and 65 and a comparator 67. As will be explained, a reference signal is transmitted and portions thereof are sampled in the receiver to determine attenuation effects on the analog portions of the signal and to compensate the receiver gain accordingly.

Figure 6:
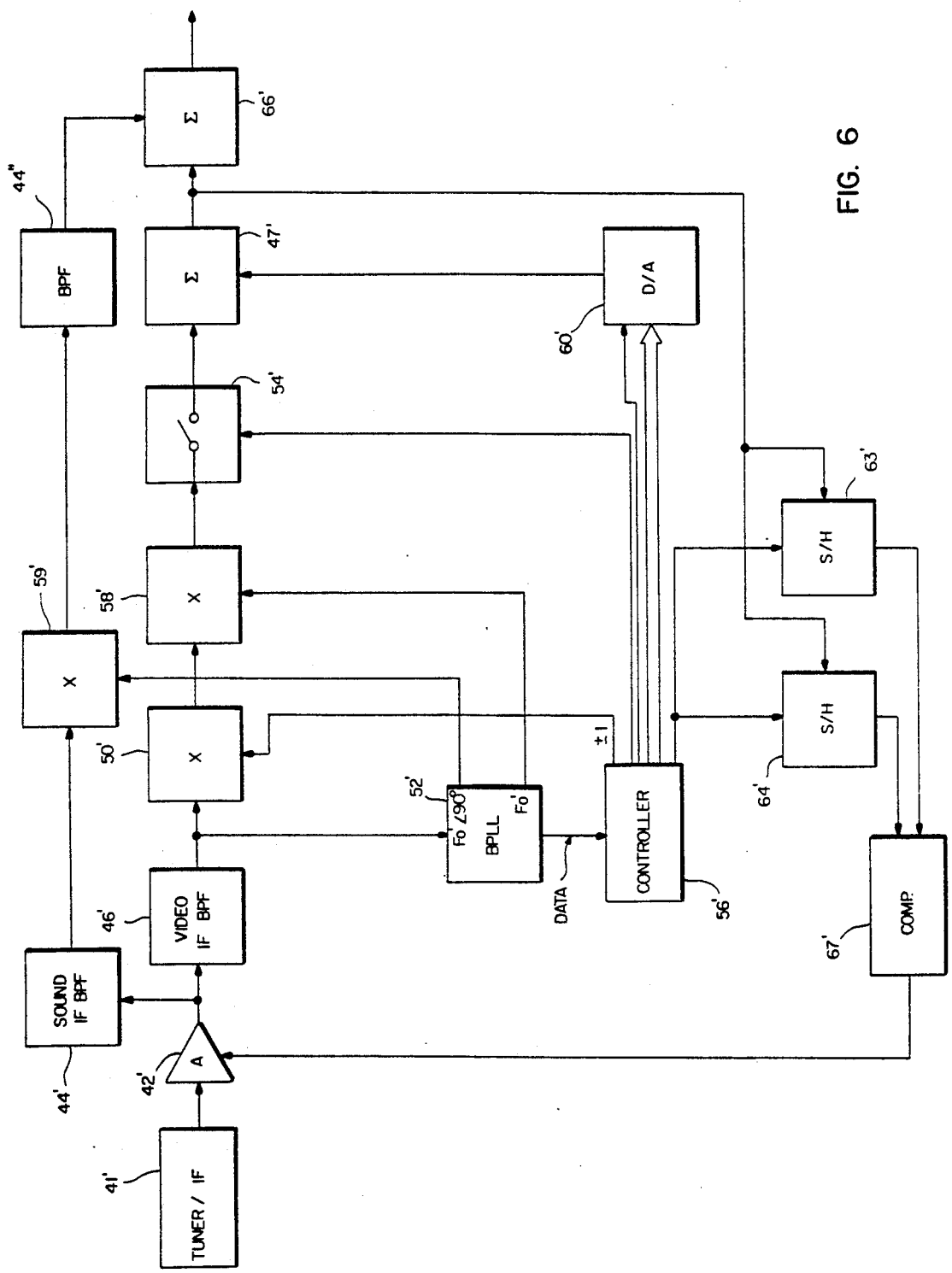
FIG. 6 is a block diagram of a basic hybrid television receiver constructed in accordance with the invention and operating at baseband frequencies.

While the receiver of FIG. 5 operates at RF frequencies, in many installations, it is desirable that the receiver operate at baseband frequencies and FIG. 6 illustrates such a receiver. A tuner/IF 41' receives the transmitted signal and applies an IF signal through an amplifier 42' to a video IF bandpass filter 46' and to a sound IF bandpass filter 44'. Filter 46', in turn, supplies the IF signal to a BPLL 52' and to a multiplier 50'. Data is removed by BPLL 52' and applied to a controller 56'. BPLL 52' also recovers a pair of quadrature-related IF carriers Fo' and Fo'/90°, Fo' being applied to a multiplier 58' and Fo'/90° to a multiplier 59'. Controller 56' determines on the basis of a received reference signal whether the phases of the received signal and Fo' are the same and controls multiplier 50' to reverse the phase of the signal, if necessary, by multiplying by a +1 or by a −1. Multipliers 58' and 59' function as synchronous detectors for developing output baseband video and 4.5 MHz sound signals, respectively, in response to Fo' and Fo'/90°. The 4.5 MHz sound signal signal is applied to a 4.5 MHz sound BPF 44" and the composite video signal is applied to a switch 54'. Switch 54' is operated by controller 56' to open during data and horizontal sync portions of the received signal. A D/A 60' is operated by controller 56' and supplies one input of a summing network 47', the other input being supplied by switch 54'. D/A 60' supplies the sync and sync pedestal to summing network 47' along with an analog signal corresponding to the coded representation of the low frequency components sent in the data recovered by BPLL 52', which are added to the baseband video signal developed at the output of switch 54'. A reconstituted baseband video signal therefore appears at the output of summing network 47' and is applied directly to a pair of S/H circuits 63' and 64', which are operated under control of controller 56' to sample the reference signal that is transmitted to determine the attenuation effects on the analog portions of the transmitted signals. Again a comparator 67' supplies any correction required to adjust the gain of amplifier 42' to match the analog signal portions with the digital representations. The reconstituted video signal is also combined with the 4.5 MHz audio signal in a summing network 66' to provide an output baseband television signal which may be applied to a television monitor or the like for viewing.

Figure 7:
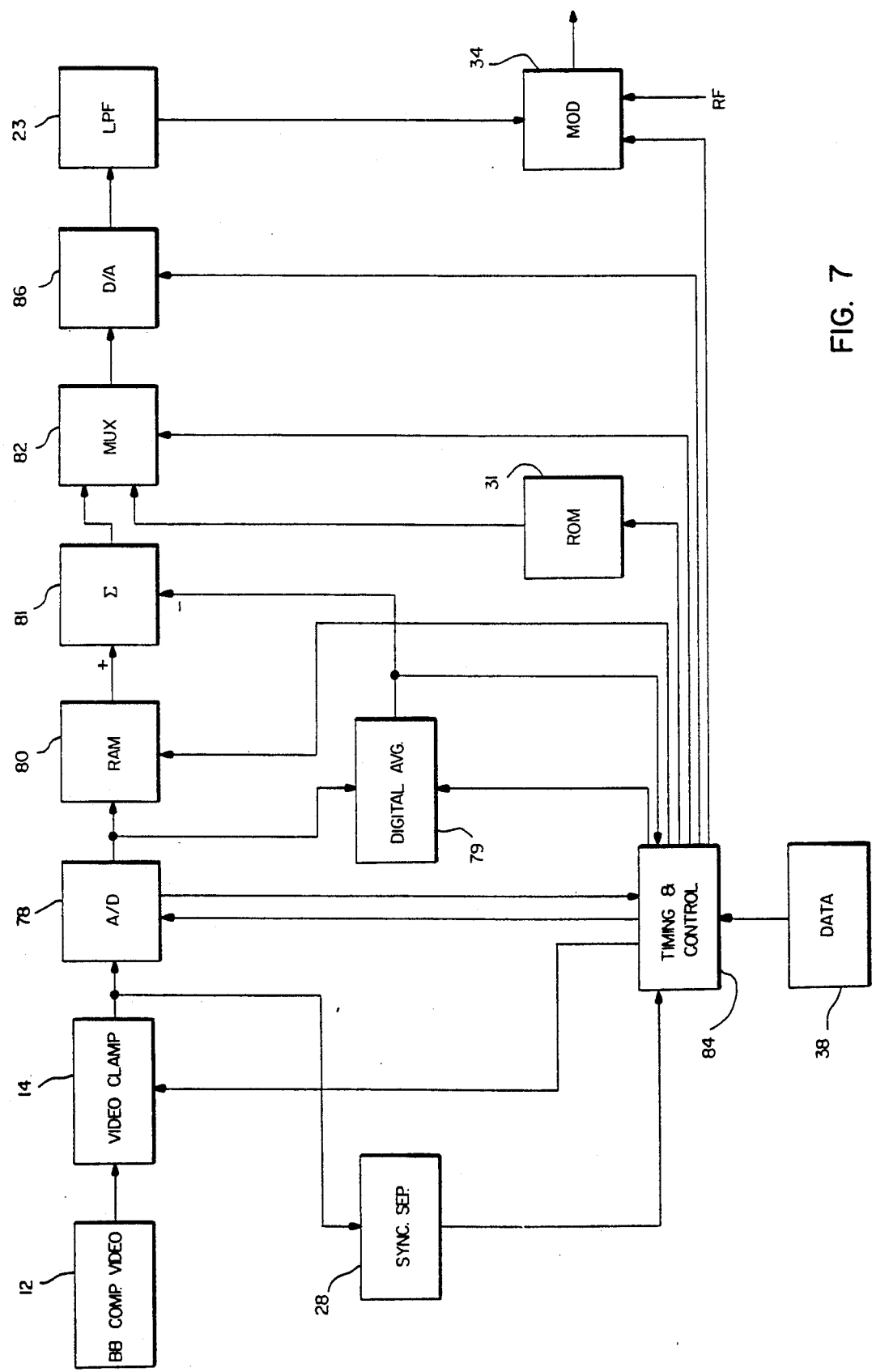
FIG. 7 is a digital implementation of a basic hybrid transmitter constructed in accordance with the invention.

Referring to FIG. 7, a digital implementation of a transmitter constructed in accordance with the basic hybrid form of the invention is shown. A baseband source of composite video signal 12 is coupled to video clamp 14, the output of which supplies and A/D converter 78 and a sync separator circuit 28. A timing and control circuit 84 is intercoupled with A/D converter 78 and is supplied with the output of sync separator 28. Video clamp 14 is operated under control of timing and control circuit 84 to clamp the incoming video signal at the back porch level. The source of data 38 is coupled to the timing and control circuit 84. The output of A/D converter 78 is supplied to a digital averaging circuit 79 and to a RAM memory 80. Digital averaging circuit 79 is operated under control of timing and control circuit 84 to sample the output of A/D converter 78 during the active video portions of the signal and to develop an average of the digital values for each individual horizontal line. This value is supplied back to timing and control circuit 84 and to a summing network 81 which is also supplied with the output of RAM memory 80. RAM memory 80 comprises a two video line memory in which one video line is written in as the previous video line is read out. This arrangement introduces a one line delay to assure that the digital average signal is subtracted from the video samples of the appropriate horizontal line. The output of summing network 81 is supplied to a multiplexing circuit 82 which is also coupled to the output of a ROM 31. ROM 31 supplies the reference and identification signals to the multiplexer 82 as will be described further below. Data from data source 38 and timing and control circuit 84 is applied to a third input of a multiplexer 82 during the horizontal blanking intervals of the signal. The data includes a coded representation of the line averaged values developed by digital averaging circuit 79. The output of multiplexer 82 is coupled to a D/A converter 86 whose output is supplied to a low pass channel filter 23 and thence to a modulator 34. Summing network 81, multiplexer 82, D/A converter 86 and modulator 34 are all operated under control of timing and control circuit 84. Modulator 34 is supplied with an RF signal and its output is further processed as indicated in FIG. 1A.

Referring back to FIG. 2, it will be seen that the waveform C is obtained by subtracting waveform B from waveform A during the active video portions of each horizontal line, except during the horizontal blanking interval 72. It will be appreciated by those skilled in the art that a similar result would be obtained by adding a waveform of magnitude B to the horizontal blanking interval only and correcting for the resulting change in zero level. When considering the digital implementation of the encoder, the latter technique involves considerable simplification and is the presently preferred method of implementation for this version of the invention.

In FIG. 7, the output of the A/D converter 78 preferably comprises approximately 910 samples per horizontal line with about 752 of those samples representing the active video portion of the line. Each sample is represented by either 8 or 10 bits depending upon the output resolution desired. For example, for ordinary commercial type television signals, an 8 bit resolution is sufficient, whereas for studio level quality and transmission applications, a 10 bit resolution is preferred. The number of bits selected for the active video portion is preferably divisible by 2 which greatly simplifies the hardware. As alluded to previously with respect to FIG. 2, it may be preferable to add the line averaged value (waveform B) to the horizontal blanking interval of the signal rather than to subtract the line averaged value from the active video portion. This would entail approximately 60 additions as compared with approximately 752 subtractions and would again materially simplify the operation and hardware. However, the result would be the same after correction for the zero level and the particular technique utilized should not be considered limiting of the invention. The digitally processed signal is then supplied from the summing network 81 to the multiplexer 82 along with data from timing and control circuit 84 and the fixed identification and reference signals from ROM 31. After passage through D/A converter 86, the signal is handled in the same manner as described with respect to the transmitter of FIG. 1A.

Because of the nature of the transmitted television signal, that is, a hybrid of analog and coded digital information, a system for compensating for transmission attenuation experienced by the analog signal (which does not alter the digital data) is provided. In order to properly reconstruct the received signal, the analog video signal may need to be adjusted to maintain the same relationship, between it and the digital data, that existed at the transmitter. The invention provides for sending a reference signal with a known relationship between the analog and digital data, detecting that signal in the decoder and comparing the detected levels to determine the amount and polarity of adjustment required, if any.

Figure 8:
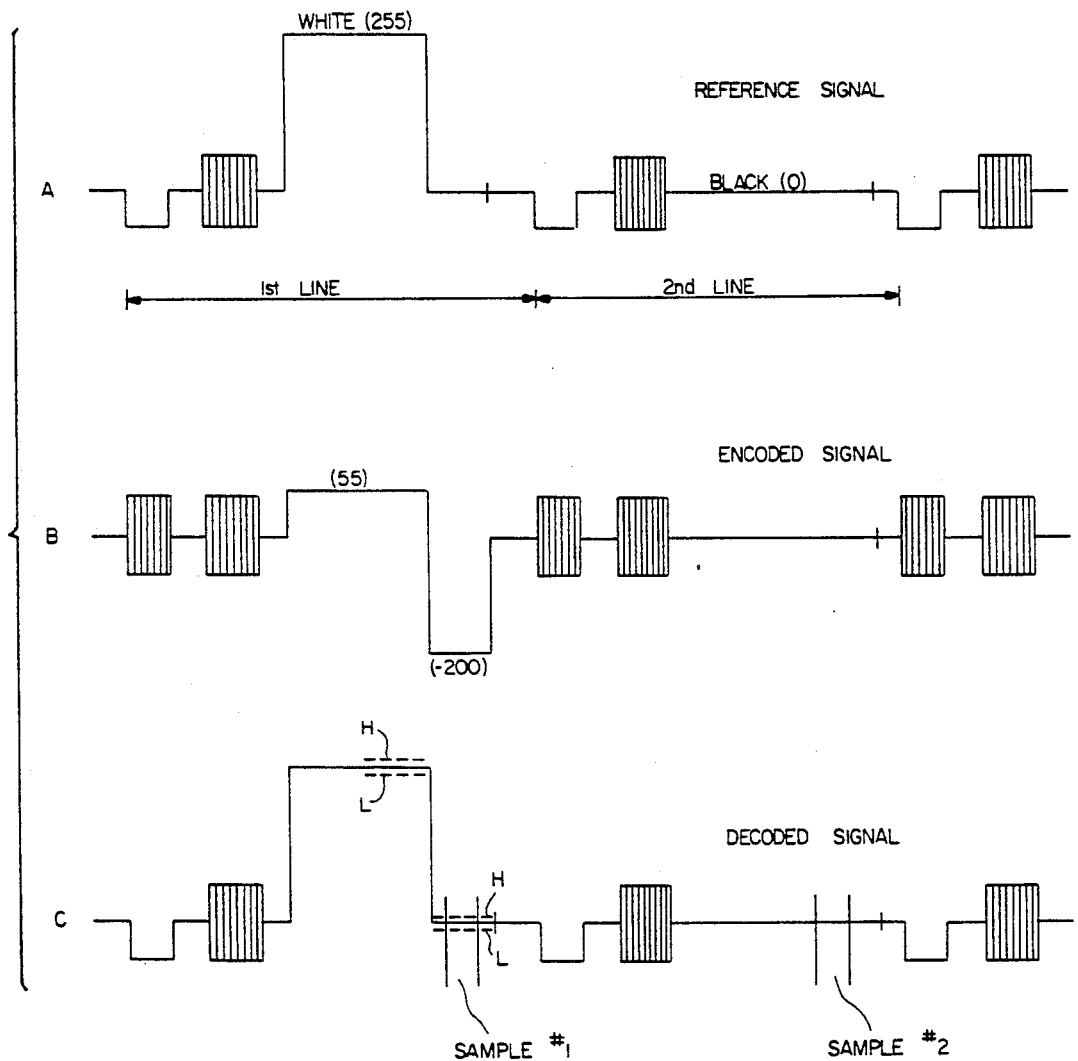
FIG. 8 is a series of waveforms explaining a novel signal level compensator for use with the hybrid aspect of the invention.

Referring to FIG. 8, waveforms A, B and C, depicting two horizontal lines of a transmitted signal are shown. Waveform A constitutes a reference signal which comprises a white line (indicated as digital level 255) that falls to zero or black level (indicated as 0) followed by a second line of no video or black level. Waveform B represents an encoded counterpart of the reference signal (A) in which the white line has been reduced to a digital level of 55 by subtraction of an assumed average level of 200. The black level portion of the video line now occupies a level of −200, reflecting the subtraction of the average level of 200 therefrom. The second line, however, is unchanged in the active video portion since its average level is zero. Waveform C represents the decoded (reconstituted) signal and also indicates two sample areas identified as sample #1 and sample #2. Samples of the levels are taken at the indicated areas and stored in the sample and hold circuits of the receiver. Under conditions where the analog signal does not experience attenuation, sample #1 will reflect that the signal level has been returned precisely to zero level and will match sample #2. Should the decoded (reconstituted) signal be higher, as indicated by the dashed line portion H, sample #1 will be greater than sample #2 and the output of comparators (67 in FIG. 5 and 67' in FIG. 6) will generate a correction voltage for application to amplifier 42 or 42'. If, on the other hand, the decoded signal is at a lower level L, sample #1 will be less than sample #2 and an opposite type correction will be supplied from the comparator to the amplifier. The provision of this reference signal, including one horizontal line with a significant analog video portion and a subsequent line with a zero analog video portion, provides a built-in standard for determining what has happened to the analog signal during transmission and processing.

Figure 9:
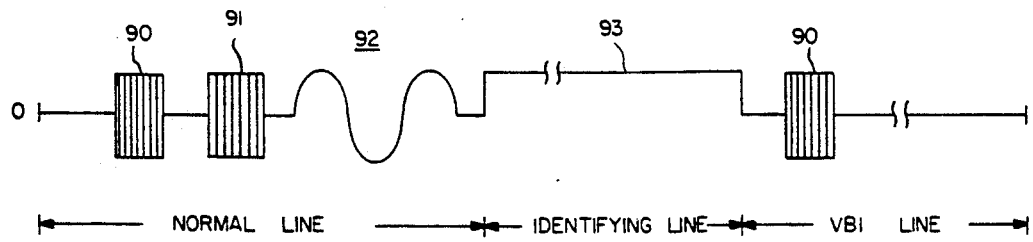
FIG. 9 illustrates a form of identification signal useful with the hybrid aspect of the invention.

In FIG. 9, one form of identification signal is shown that serves the dual purpose of providing a start signal for timing purposes and for identifying the proper phase relationship between the video carrier signal and Fo. A normal encoded line (shown not-to-scale) includes data, horizontal pulses 90, a color burst 91 and an active video portion 92, which assures a certain number of zero crossings. Detection is based upon no zero crossings occurring during a line. An identification line is established without zero crossings by removing data pulses and color burst. The polarity of the video signal 93 may be used to indicate a particular phase relationship between the video carrier and the recovered Fo signal. The next line, assumed to be in the vertical blanking interval, does not have color burst, but does have data pulses. Thus, it too exhibits zero crossings. It will be appreciated that this illustration is but one of many arrangements that may be used for an identification signal.

Figure 10:
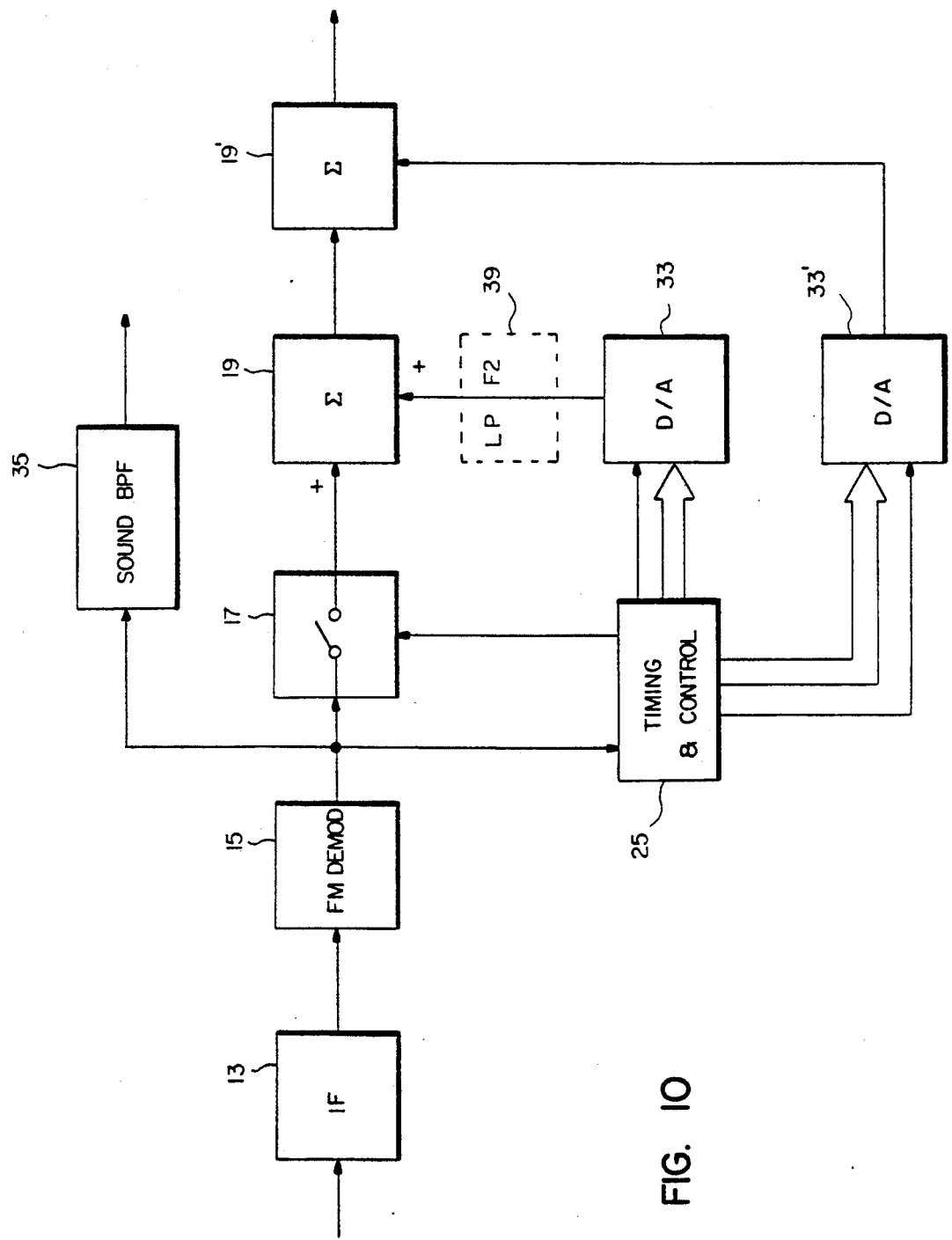
FIG. 10 is a block diagram of a receiver for processing a hybrid FM modulated transmitted signal.

In FIG. 10, a receiver for receiving a basic hybrid processed FM television signal is shown. The signal received by IF 13 is supplied to a conventional FM demodulator 15 which in turn is coupled to a switch 17, a timing and control circuit 25 and a sound bandpass filter 35. Timing and control circuit 25 receives data from demodulator 15 and controls operation of switch 17 as well as supplying the coded data information to a D/A converter 33. The sync signal information is used to develop timing signals which are supplied to a D/A 33'. The output of switch 17 feeds a summing circuit 19 as does the output of D/A converter 33. The output of summing circuit 19 is supplied to another summing circuit 19' which is also supplied with the timing signals from D/A 33'.

The dashed line block 39 labelled LPF 2 is not used in the basic hybrid FM receiver, but is used in conjunction with an extended hybrid receiver for receiving an extended hybrid processed signal as discussed below.

The basic hybrid processing circuit described removes low frequency analog video signal components (below the horizontal line frequency) by subtracting the line averaged value of these components from the analog signal. This will be recognized as a specific example of a more general hybrid approach to television signal processing in which the video signal is divided into low frequency and high frequency components. It will be noted that the low frequency video components under 15 KHz account for the vast majority of transmission power required and that the removal of additional analog video components (under about 200 KHz) does not result in significant additional transmission power savings. However, extended hybrid processing does yield highly beneficial results in terms of developing a television signal of improved signal to noise performance and having minimum co-channel and adjacent channel interference potential with respect to NTSC signals. Thus, in the extended hybrid processing system of the invention, video signal components below about 200 KHz are removed, converted into digital form and coded data representative of the removed components is sent in a non-active video interval of the analog signal.

Figure 11:
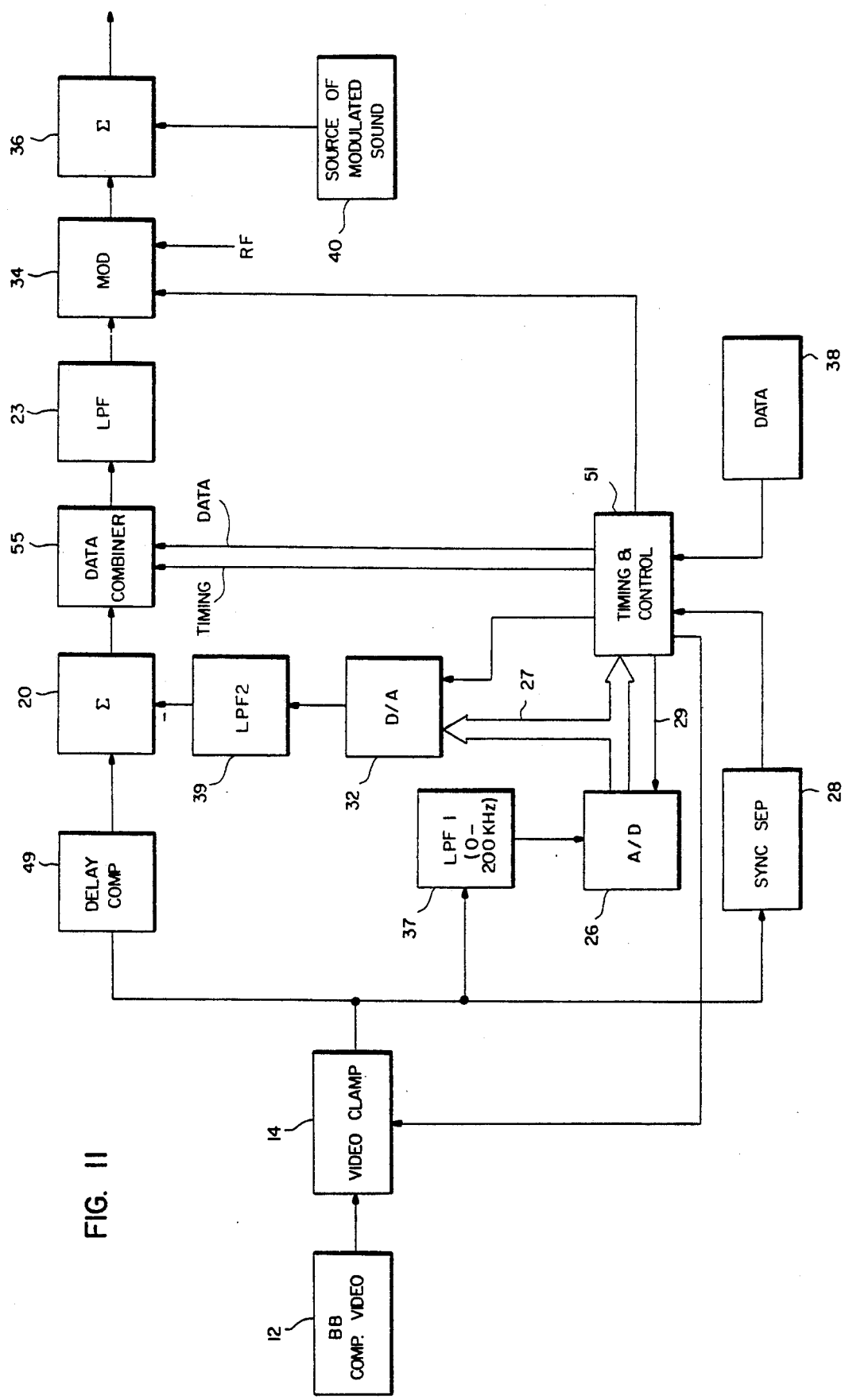
FIG. 11 is a block diagram of an extended hybrid television signal transmitter constructed in accordance with the invention.

In the extended hybrid transmitter of FIG. 11, the output of the video clamp 14 is supplied to a delay compensation network 49, which in turn is coupled to a summing circuit 20. The video signal is also supplied to sync separator 28 and to a low pass filter (LPF 1) 37. The filter 37 is indicated as passing frequencies up to about 200 KHz. The output of filter 37 is supplied to A/D converter 26 which in turn supplies D/A converter 32, the output of which is coupled to a filter 39 (LPF 2) and to a timing and control circuit 51. The output of filter 39 is subtracted from the full analog video signal in summing circuit 20. A data combiner 55 receives the output of summing circuit 20 and data and timing signals from a timing and control circuit 51. The remainder of the circuit is substantially the same as that of FIG. 1A and operation is essentially the same. Filter 39 is not required if a full resolution digital coded representation is used. In most instances, however, the number of bits from A/D converter 26 will be limited, thus limiting the resolution, and filter 39 is included to assure that the transmitted signal will match that produced in the receiver.

Figure 12:
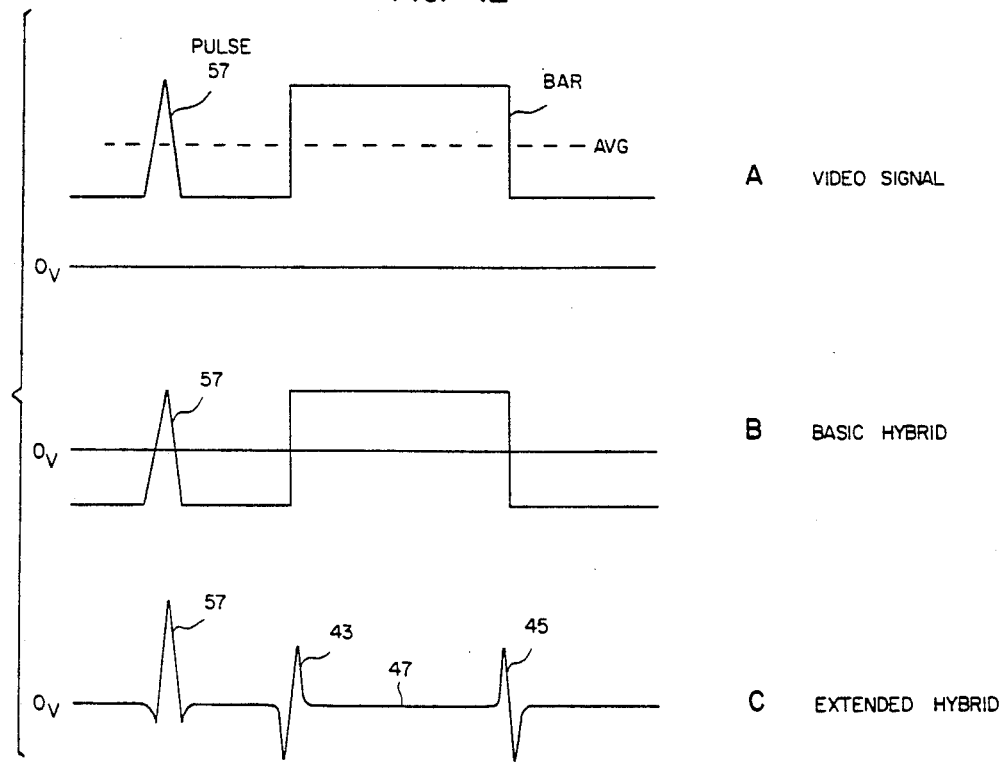
FIG. 12 is a set of waveforms useful in understanding the hybrid processing of the invention.

In FIG. 12, the effects of basic hybrid and extended hybrid processing on an idealized video signal consisting of a pulse and a bar are illustrated. Curve A represents the video signal having a relatively sharp pulse followed by a fairly broad bar. As shown, the average signal level is significantly above 0 volts. Curve B illustrates a pulse 57 and a bar signal when it is subjected to basic hybrid signal processing in accordance with the invention. It will be seen that the average signal level has been subtracted, thus reducing the overall magnitude of the signal. Curve C shows the signal after extended hybrid processing in accordance with the invention. Here it is seen that only high frequency signals, such as doublets 43 and 45 and pulse 57, which correspond to video edges and video detail, remain since the low frequency components, up to about 200 KHz, have been removed. In particular, extended hybrid processing produces a significant number of voids, such as that indicated at 47, in the transmitted analog signal. As will be discussed below, the voids are extremely useful for reducing the peaks in the remaining transmitted analog signal by the techniques of compression and dispersal filtering. As is well known, peak signals are of greatest importance when dealing with co-channel and adjacent channel interference problems.

Figure 13:
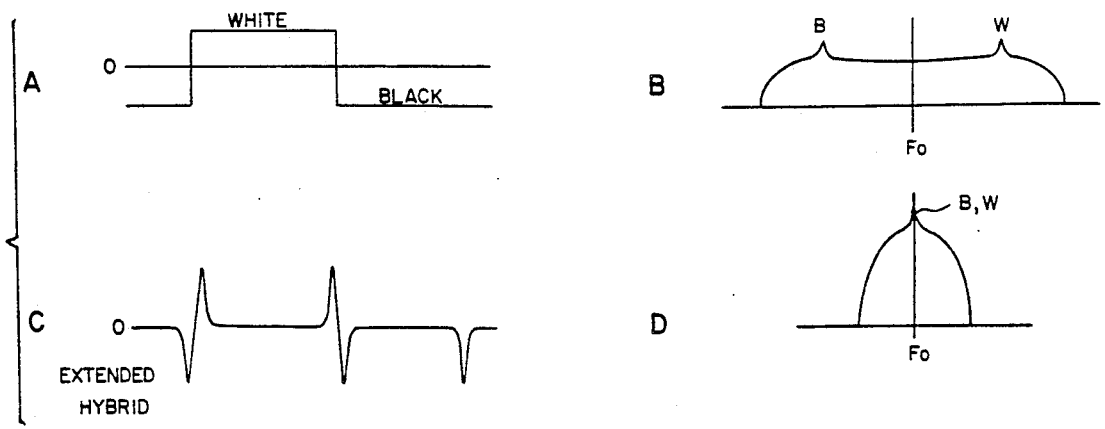
FIG. 13 is a series of waveforms illustrating the FM bandwidth for different types of signal processing.

FIG. 13 illustrates the effects of hybrid processing of a square wave video signal on FM transmission bandwidth. Curve A illustrates a basic hybrid processed signal corresponding to a horizontal line of a one-half white and one-half black screen. Waveform B illustrates the transmission bandwidth centered about a carrier frequency Fo for the signal. In the extended hybrid processed waveform illustrated by curve C, only signal spikes in the form of doublets remain and the bandwidth shown by curve D is very much narrower, with the frequency deviation due to the black and white level signals, folding onto each other at the center frequency Fo since they each correspond to a zero volt signal. The extended hybrid signal FM transmission bandwidth is thus seen to be very much smaller than the bandwidth corresponding to the basic hybrid processed signal. This FM transmission bandwidth reduction translates into significantly improved noise performance in the FM channel and is an outstanding attribute of the extended hybrid processing of the invention. It should be noted that while signal to noise performance is greatly improved, no information is lost (the removed low frequency information is replaced in the receiver) and consequently distortion is not increased.

As mentioned, peak signal magnitude is the major factor in contributing to adjacent channel and co-channel interference problems. Such peaks, in the form of doublets and pulses, are produced in the extended hybrid processing in response to video edge and video detail, i.e. whenever the video level changes rapidly. As was also discussed above, the signal level during non-video portions of the signal (blanking periods) is arbitrarily established in the hybrid processing system. As has been shown in the basic hybrid system, the line averaged video is used to set the horizontal line signal level at the average signal level for that line. Consequently, when the blanking interval ends, the video signal level will in all probability be closer to its average value for the line than it would be to an arbitrary level that had been established. Therefore, the magnitude of video level change (and of doublets produced by extended hybrid processing) will be minimized by setting the line to the average video level for that line. As mentioned in connection with the copending application, the transmitted video signal need not have horizontal blanking intervals, nor horizontal sync. It will, of course, have a line structure, and there will be transitions from line to line. These transitions appear as doublets when hybrid processed, and it would be of benefit to minimize their amplitude. Therefore two step processing is employed in which the line average of a line is removed with basic hybrid processing, prior to performing extended hybrid processing. Thus, two step hybrid processing is very desirable since with it, the level of the video signal between lines (and in the vertical blanking interval) is set to the average video signal level to reduce the magnitude of doublets produced. It is also contemplated that the average of adjacent video lines be used to reduce the doublet magnitude.

Figure 14:
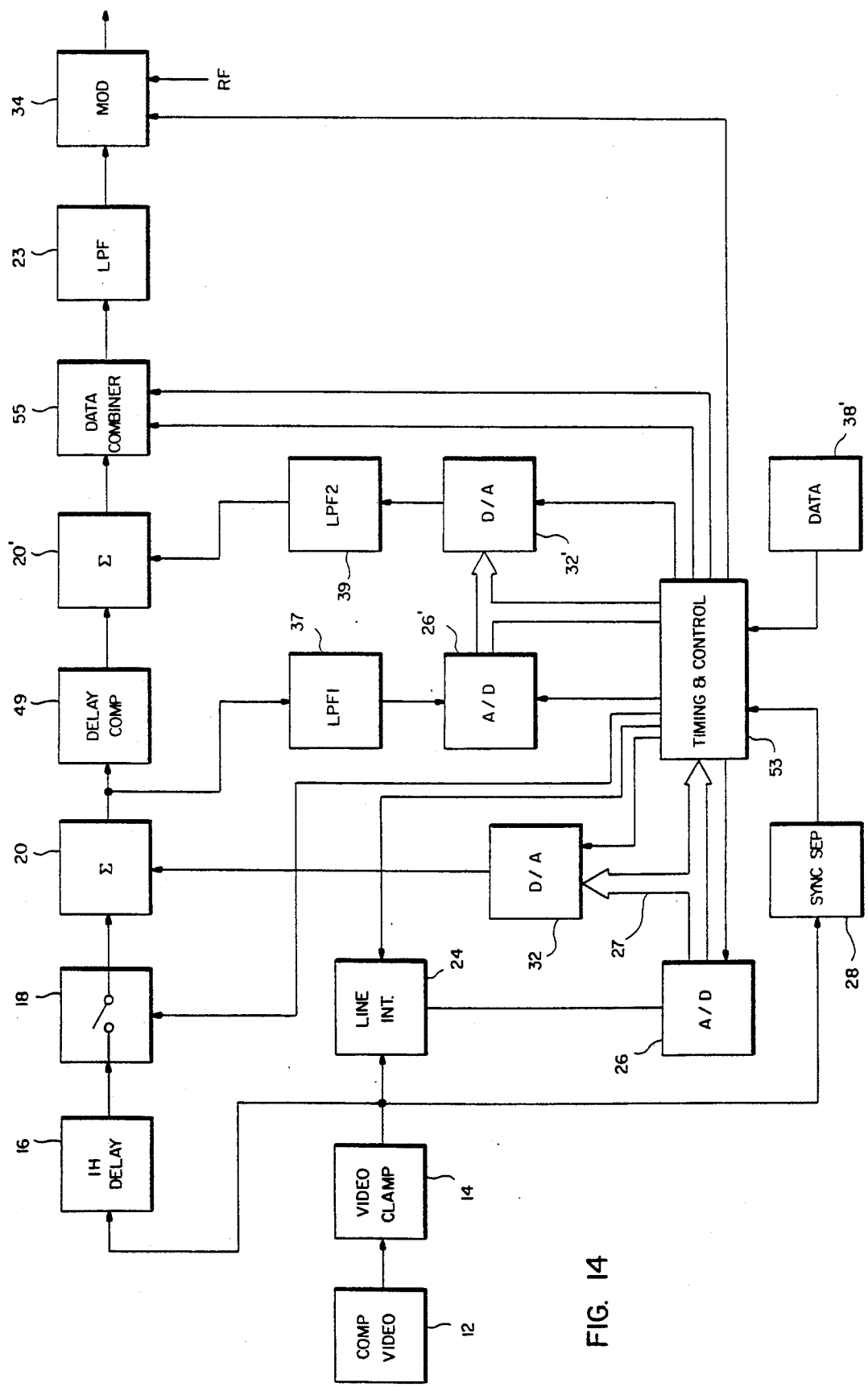
FIG. 14 is a block diagram of a transmitter illustrating two step hybrid processing in accordance with the invention.

FIG. 14 shows a transmission system that incorporates two step processing, i.e. first basic hybrid and then extended hybrid processing. The basic hybrid processing occurs by virtue of line integrator 24, A/D converter 26 and D/A converter 32, one H delay circuit 16, switch 18 and summing circuit 20. The extended hybrid processing occurs by virtue of filter 37, A/D converter 26', D/A converter 32', filter 39, delay compensation circuit 49 and summing circuit 20'. The basic hybrid processing is performed first and is followed by the extended hybrid processing. Timing and control circuit 53 supplies appropriate timing and data signals to data combiner 55. As mentioned, the data is placed in non-active video portions of the signal, which will generally comprise the vertical blanking periods or both horizontal and vertical blanking periods.

Figure 15:
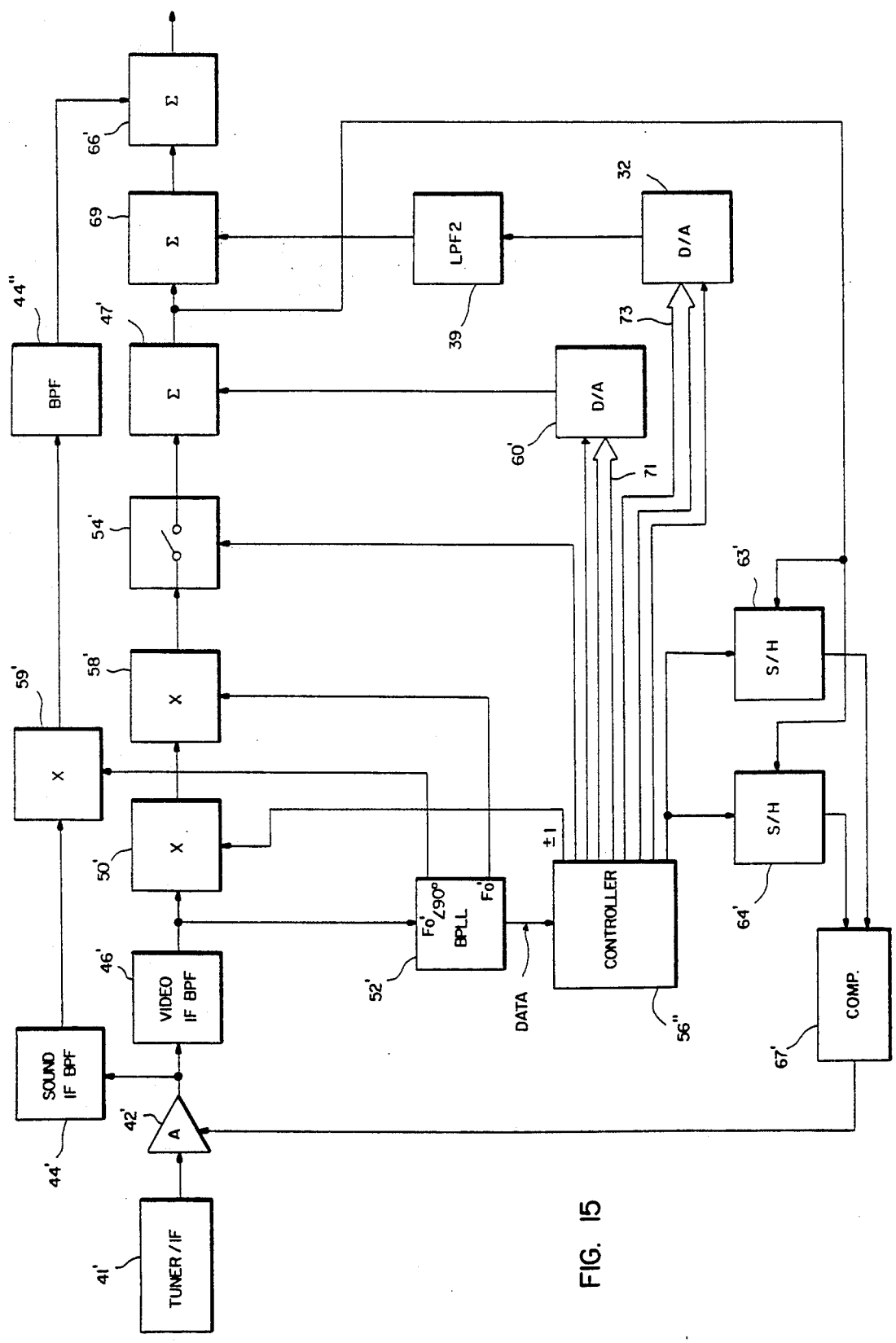
FIG. 15 is a block diagram of a receiver utilizing a two step hybrid processed signal.

FIG. 15 illustrates the basic hybrid receiver of FIG. 6 modified to accept a two step hybrid processed signal such as that produced by the transmitter of FIG. 14. The receiver includes a D/A 32 and a filter 39 which are supplied with the extended hybrid data by controller 56". After detection by BPLL 52', the removed basic low frequency information is added in summing network 47', and the remainder of the low frequency information is added in summing network 69. The frequency response characteristic of LPP2 filter 39 is, of course, the same as that of LPF2 39 in the transmitter, which is indicated by the same reference number being used for each.

The basic hybrid and extended hybrid processing of the invention, when combined with certain well known techniques in the art such as temporal pre-emphasis or filtering (also referred to as frame combing or field processing) signal compression, time dispersal and pre-emphasis, yields a television system of optimal signal and noise characteristics.

Figure 16:
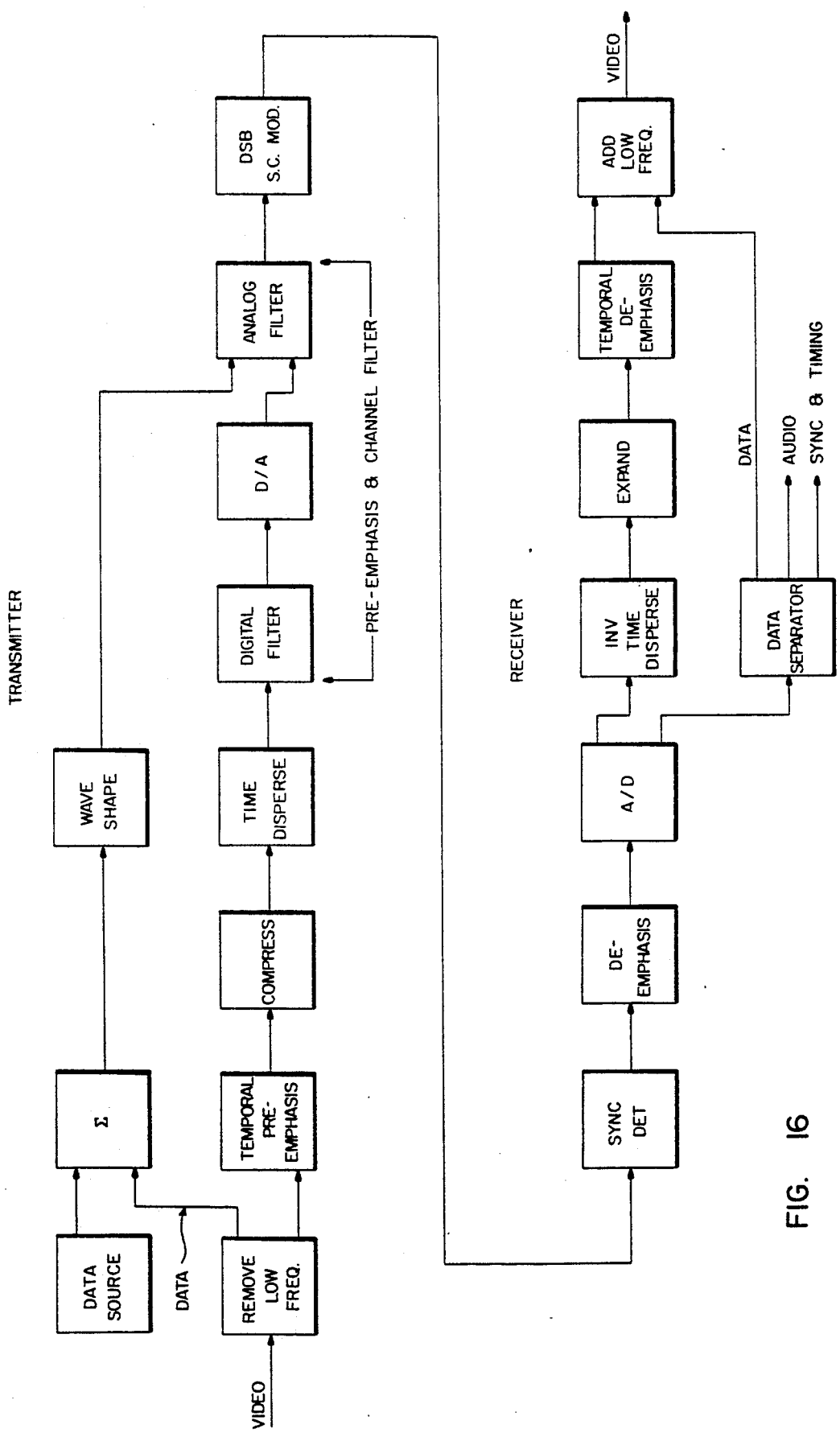
FIG. 16 is a simplified block diagram or an optimal television transmission and reception system using the principles of the invention.

In FIG. 16, such an optimal television system with minimum adjacent and co-channel interference includes a digital type transmitter having a hybrid processing stage (may be two step) to remove and digitally encode low frequency video components as data. The remaining signal comprising digitized high frequency components is subjected to temporal pre-emphasis for emphasizing the changes between successive frames of video and then subjected to compression and time dispersion. The dispersed signal is subjected to pre-emphasis and channel filtering before modulation on a double sideband suppressed carrier that is centered in a 6 MHz frequency band. The pre-emphasis and channel filtering may be accomplished by applying the time dispersed signal (in digital form) to a digital filter and then D/A converting it and applying it to an analog filter which also receives the representative data (hybrid) and other data after suitable waveshaping.

The receiver incorporates a true synchronous detector, followed by a signal de-emphasis stage and an A/D converter. The digitized signal is subjected to inverse time dispersion, expansion and temporal de-emphasis to obtain the digitized high frequency component. The removed low frequencies are reconstructed from the data and the original signal recovered by adding back the removed components. The system has very attractive advantages in minimizing adjacent channel and co-channel interference. Further, the carrier frequency may be arranged to have a "precise offset" frequency relationship with co-channel NTSC (or hybrid) signals. The precise offset frequency, as is well known in the art, should be a one-third or one-half multiple of the horizontal scan rate and a one-half multiple of the vertical scan rate. The effect of this precision offset is to break up sections of video, corresponding to DC, into lines of video (at about 10 KHz) which is visually much less perceptible on a television screen. Thus, a co-channel video display would be significantly broken up and thereby rendered much less noticeable. The hybrid signal should also be frame locked to the NTSC co-channel to assure that the data portions of the hybrid processed signal (data is sent in the vertical blanking intervals) do not occur during video portions of the NTSC co-channel. In the copending application referred to above, the transmitted signal has no sync which further reduces the peak signal excursions and aids co-channel performance.

In FIG. 17, temporal pre-emphasis in the transmitter is illustrated. The video input signal is subjected to a delay of T (one field delay), multiplied by a factor "a" (less than one) and subtracted from the undelayed signal. Its impulse response and frequency response are shown. The opposite action occurs in the receiver as illustrated in FIG. 18 where the input signal is subjected to a delay of T, multiplied by the same amplification factor "a" and fed back to the signal.

Frame combing has been used in the prior art for separation of color signals. The benefit of frame combing or temporal filtering has not been recognized in encoding video signals for reduced power transmission. Its use in a hybrid television signal system reduces transmission power for static images and thereby helps to reduce interference of the hybrid signal into an NTSC co-channel and also to minimize co-channel interference from an NTSC channel into a hybrid signal receiver. The temporal pre-emphasis filter response for static images (zero temporal frequency) is at a minimum while its response for frequencies equal to T/2 is at a maximum. As shown, the response for static images is reduced to a 1−a and at one-half the field rate is increased. These numbers are of course a function of the actual filter design. Thus, the video signal corresponding to a static image is reduced significantly. Since most television pictures are relatively static, the overall interference into an NTSC co-channel will be reduced. For video motion, the interference into the NTSC co-channel, while not reduced, will be much less noticeable because fast moving video images (very small width moving edges) are difficult for the human eye to resolve.

The complementary receiver temporal de-emphasis filter in FIG. 18 has the opposite effect and is an infinite impulse response filter with a single pole which cancels the zero in the corresponding filter of the transmitter. The combined frequency response of the transmitter temporal filter and receiver temporal filter is flat. The response of the receiver temporal filter at zero temporal frequency (static input) is at a maximum while the response for moving images is at a minimum. In conjunction with the precision offset mentioned above, the static portions of the NTSC co-channel interference can be made to appear as one-half field rate temporal frequency components, falling into the troughs of the filter response thereby be reduced significantly.

Signal pre-emphasis and de-emphasis may be used to help improve the noise performance of the hybrid signal. Circuitry therefor is not illustrated since it involves well known boosting of the high frequencies during transmission and reducing or rolling off the boosted high frequencies in the receiver. The receiver filter may have a haystack shape and sharply discriminate against adjacent channel frequencies.

A compander compressor is illustrated in FIG. 19 and a compander expander is illustrated in FIG. 2. Companding (that is compressing and expanding) improves interference performance both to and from an NTSC co-channel. This is so, since with hybrid processing, high signal amplitudes only occur during transitions, such as on video edges or in video detail. (With temporal pre-emphasis, high signal amplitudes only occur on moving edges.) As seen in FIG. 19, the compressor has a non-linear transfer characteristic that raises the level of low amplitude signals and lowers the level of high amplitude signals. By reducing the amplitude of the highest amplitude signals, the signal peaks that cause co-channel interference are reduced. The low amplitude signals are increased, but they are not the peak signals that are responsible for co-channel interference. In the receiver, the expander transfer characteristic is complementary (see FIG. 20), so that the overall effect on the signal is flat. The expander, it will be noted, also serves to reduce interference from the NTSC co-channel into the hybrid signal channel. The NTSC co-channel will, under the worst conditions, be a low amplitude signal and the hybrid signal exhibits high amplitudes only during video movement and for video detail. The hybrid receiver will receive a signal that will be a sum of the low amplitude co-channel and the hybrid signal. In areas of low detail, where the co-channel interference will be most visible, the combined signal levels of the co-channel and hybrid signal will still be small and the expander will further reduce that by the inverse of the amplification factor of the compressor. Thus, the most visible interfering signals are reduced. During moving video and video detail in the hybrid signal, where the co-channel is least visible, the combined levels of the co-channel and hybrid signal is high and will be further increased by the expander characteristic. The result is that the co-channel interference is shifted from low video detail (flat, stationary) areas to high detail and moving areas where it is much less visible. Noise is also processed as co-channel interference and therefore the same improvement is obtained with respect to noise performance. The compression process may create distortion products in the video signal which can be compensated for by suitable peaking.

HDTV SYSTEM FORMAT

In accordance with another aspect of the invention, the optimal transmission system described above is used for transmitting an HDTV signal which is encoded to further minimize the affects of co-channel and adjacent channel interference with indigenous (e.g. NTSC) nearby transmissions.

The HDTV system format of the present invention provides an improvement in horizontal resolution of about 1.84 relative to NTSC for a receiver having a 5:3 aspect ratio, and about 1.73 in the case of a 16:9 aspect ratio display. In order to provide an approximate doubling of NTSC resolution, the displayed image on the receiver is produced by 720 lines of active video progressively scanned at the NTSC vertical field rate of 59.94 Hz and at a horizontal scan rate of three times NTSC (47.2 KHz), with each line having a horizontal resolution of about 1020 lines per width (lpw), or, stated otherwise, about 510 cycles per picture width (cpw). In order to support this horizontal resolution, the minimum horizontal bandwidth of the video source signal at the transmitter is 28.9 MHz. This source signal may be provided at the transmitter by a video source producing a 787.5 line progressively scanned signal, having a vertical rate of 59.94 Hz and a horizontal scan rate of 47.2 KHz. The video source signal is encoded for transmission over a 6 MHz RF channel, the encoding process converting the video source signal into a transmission format having a line and field structure equivalent to that used in NTSC to facilitate the reduction of co-channel interference between HDTV and NTSC co-channels. In addition, the HDTV signal is more easily transcoded into an NTSC signal.

More specifically, the HDTV source signal is transmitted over a 6 MHz RF channel in a format wherein each frame comprises five (5) fields transmitted at the NTSC vertical rate of 59.94 Hz. Each field actually comprises a pair of sub-fields, each transmitted on a respective quadrature component of a suppressed carrier signal approximately centered in the RF channel. Within the context of this transmission format, the video source signal is encoded according to a scheme whereby low frequency horizontal and vertical luma components are transmitted at the NTSC vertical rate of 59.94 Hz while the higher frequency luma components and color difference components are transmitted at 1/5 this rate (i.e. approximately 12 Hz).

Briefly, the luma component of the video source signal is initially separated into three substantially contiguous horizontal frequency bands which, together with a pair of color difference signals, are then encoded into a series of components collectively comprising 480 lines of video and color information every 1/59.94 seconds. Each line has a time duration of about 63.56 microseconds (corresponding to an NTSC horizontal line including the blanking interval) and has a nominal bandwidth of 2.675 MHz. The 480 lines are divided between two sub-fields each including 240 active lines of video information. Five pairs of sub-fields comprise a complete frame of video information. In addition to the 240 pairs of video lines, each sub-field pair also includes a block of audio, timing and synchronizing signals. The audio, timing and sync signals occupy the equivalent of 22 and 23 NTSC horizontal lines in successive fields, corresponding to the vertical blanking interval of an NTSC signal. The video lines, which are derived from the lines of the video source signal, are selected for transmission in a manner providing an optimal match with the human visual system. Thus, the video lines representing the low frequency luma component, are transmitted at a high temporal rate (59.94 Hz) for good motion rendition while the video lines representing the higher frequency luma components, together with the color difference components, are transmitted at a lower temporal rate (12 Hz). In addition, the lines are time multiplexed for transmission such that a predetermined number of lines derived for each luma horizontal frequency band is transmitted each field. This allows decoding of the transmission to be effected using the equivalent of a single frame store. Resolution of edges of the video image displaced from true vertical and horizontal is optimized by transmitting the low frequency luma band at full vertical resolution and reducing the transmitted resolution of the higher luma bands in discrete steps.

The encoding process of the invention is illustrated in detail in FIG. 21. As shown, an encoder 110 receives three input signals from an HDTV signal source, such as a video camera; an HDTV luma input signal at a terminal 112 and two HDTV color difference input signals C1 and C2 at terminals 114 and 116, respectively. The input luma and color difference signals are preferably provided in digital form. Also, the HDTV signal source may provide RGB output signals, in which case a suitable matrix circuit would be used to provide the luma and two color difference input signals. In order to achieve the desired resolution, the output of the HDTV signal source comprises a progressively scanned 787.5 line image (three times the number of lines in an NTSC field), having a vertical rate exactly equal to the NTSC vertical rate of 59.94 Hz and a horizontal rate of 47.2 KHz which is exactly equal to three times the NTSC horizontal scanning rate. The output signal further has a minimum horizontal bandwidth of 28.9 MHz.

Figure 22:
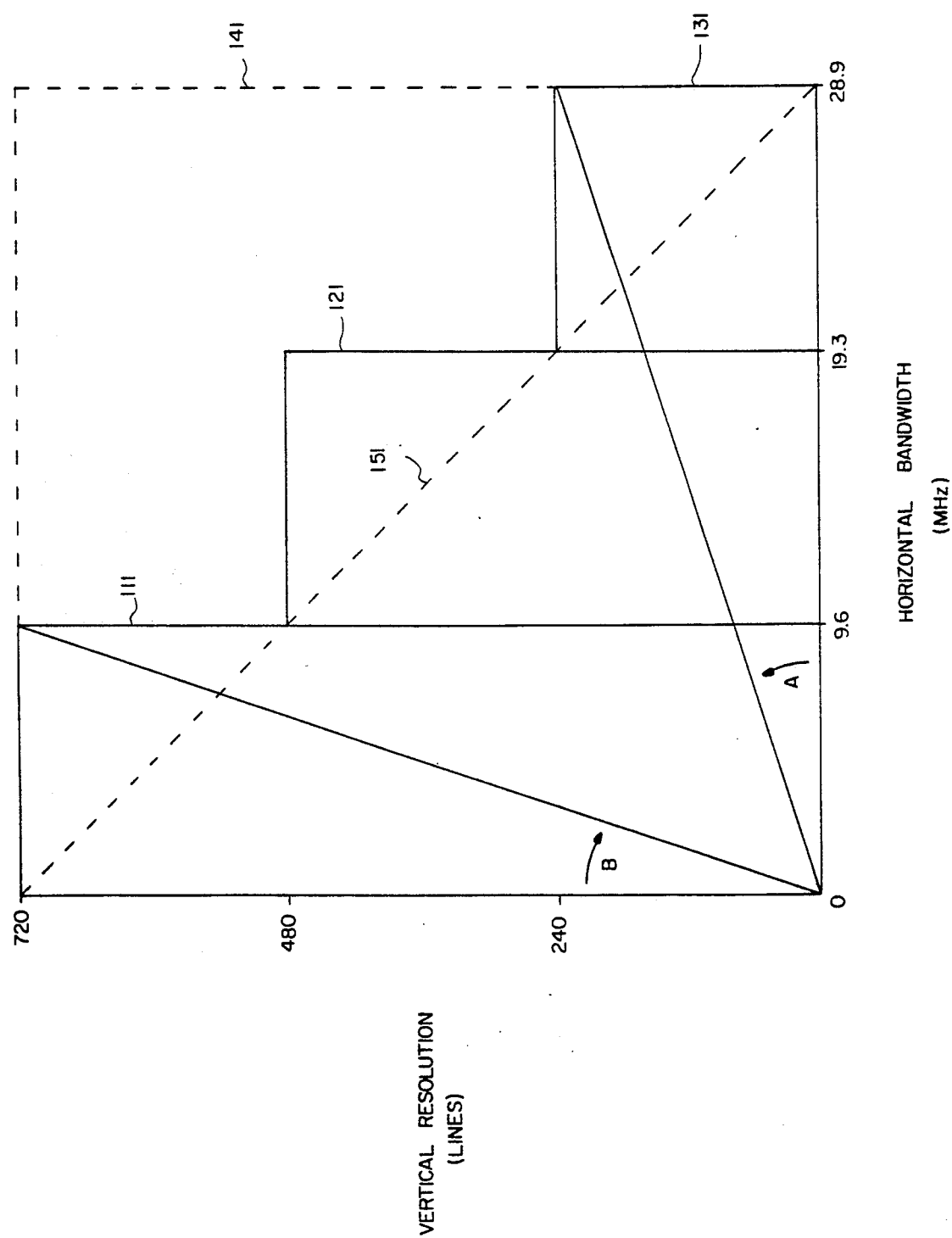
FIGS. 22 and 23 graphically illustrate portions of the encoding process performed by the encoder of FIG. 21.

As explained in further detail below, the luma encoding process initially separates the luma signal provided at input terminal 112 into three (3) horizontal frequency bands of approximately 9.6 MHz as shown in FIG. 22. All of the information in the low band (0-9.6 MHz) is transmitted in one frame (5 fields) at the full vertical resolution of 720 lines as represented by rectangle 111. All of the information in the middle (9.6-19.3 MHz) and high (19.3-28.9 MHz) bands are also transmitted in one frame but at reduced vertical resolutions of 480 and 240 lines as represented by rectangles 121 and 131 respectively.

If all three horizontal bands were to be transmitted at full vertical resolution (720 lines), the spectrum required would be that represented by the large rectangle 141. This spectrum may be reduced in half by limiting the vertical resolution of each band as defined by the diagonal line 151, as has been proposed in the art. However, this technique has a number of disadvantages. First, extremely complicated and expensive two-dimensional diagonal filters must be used to achieve the illustrated result. Second, and perhaps more important, resolution for edges which are not quite vertical or horizontal is severely degraded. Vertically tilted or displaced edges are represented by angle A in FIG. 22 while horizontally tilted or displaced edges are represented by angle B. Such tilted or displaced edges occur frequently in video images and preferably should be reproduced with maximum resolution. However, as previously mentioned, in the case of the diagonally filtered spectrum, such edges are severely degraded. In particular, since the maximum vertical resolution is defined by diagonal 151, as angle A or B begins to increase (due to an edge being tilted from vertical or horizontal respectively) resolution is immediately reduced, the reduction increasing linearly along diagonal 151. In fact, full vertical or horizontal resolution is only achieved for perfectly vertical or horizontal edges.

These limitations are overcome according to the invention by providing full vertical resolution for the entire low frequency band 111, and reducing the resolution in discrete steps for the middle and high bands 121 and 131 as shown. Full vertical resolution is therefore achieved for edges displaced from true vertical by as much as the angle A. Similarly, full horizontal resolution is achieved for edges displaced from true horizontal by as much as the angle B. In addition, the spectrum can be realized using only relatively straight-forward vertical and horizontal filters rather than the much more complex two-dimensional diagonal filters. The only slight disadvantage is that there is only about a 33% spectrum utilization reduction (rather than 50%) relative to the full spectrum represented by rectangle 141.

Figure 23:
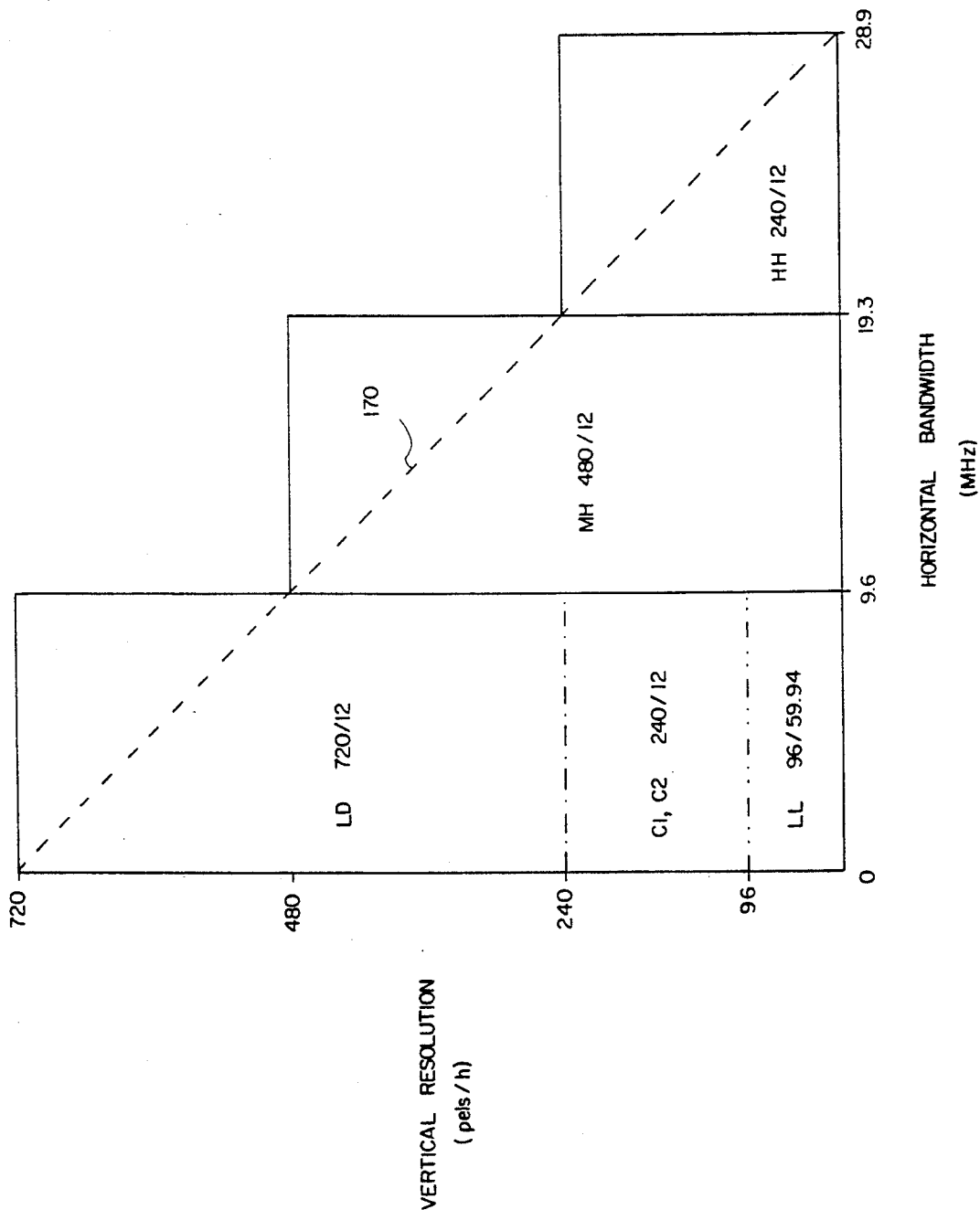

The luma encoding process actually separates the luma signal provided at input terminal 112 of encoder 110 into four components, two components representing the low horizontal frequency band and one component for each of the middle and high bands. These four components are shown in FIG. 23 where they are labeled LL, LD, MH and HH. Together, the LL and LD components represent the lower one-third (0-9.6 MHz) of the horizontal frequencies of the HDTV luma input signal with full 720 line vertical resolution. The MH component represents the middle one-third (9.6-19.3 MHz) of the horizontal frequencies with only 480 lines of vertical resolution and the HH component represents the upper one-third (19.3-28.9 MHz) of the horizontal frequencies with 240 lines of vertical resolution. The LL component is transmitted at the rate of 59.94 Hz for providing a low detail video image at a relatively high temporal rate while all of the remaining components are time multiplexed for transmission at 1/5 this rate (approximately 12 Hz) for updating the high detail video information at a relatively low temporal rate.

With further reference to FIG. 21, the input luma signal at terminal 112 is initially applied to three input filters 118, 120 and 122 which separate the input luma signal into the three 9.6 MHz bands illustrated in FIGS. 22 and 23. Filter 118 is a low-pass filter which passes only the lower one-third of the horizontal frequencies of the input luma signal, while filters 120 and 122 are bandpass filters which respectively pass the middle and upper one-third of the horizontal frequencies.

The 0-9.6 MHz signal developed at the output of filter 118 is coupled to a first vertical low-pass filter 124 and therefrom to a first vertical resampler 126. It will be recalled that the video source provided a signal having 787.5 progressively scanned horizontal lines at a vertical rate of 59.94 Hz. Of these 787.5 lines, 720 represent active video. Circuit 126 resamples the 720 lines of active video to 96 lines for developing component LL for transmission at a 59.94 Hz rate. Filter 124 is provided to smooth the vertical transitions of the output of horizontal filter 118 so as to provide a signal compatible with the resampling rate of circuit 126. That is, by selecting a cut-off frequency for vertical low-pass filter 124 corresponding to approximately 96/2 or 48 cycles per picture height, no aliasing products will be generated by circuit 126 during the resampling process. Prior to transmission, the 96 lines provided at the output of vertical resampler 126 are time expanded by a factor of 3.6:1 in a first time expander circuit 128. This, at the same time, reduces the horizontal bandwidth of each line by a factor of 3.6:1 to approximately 0-2.7 MHz. This time expansion factor expands each line to a duration of approximately 63.56 microseconds. The entire line may be used to transmit video information or, alternatively, a small portion of each line may be reserved for an appropriate blanking signal. The output of circuit 128 is therefore a 0-2.7 MHz horizontal bandwidth component LL (see FIG. 23) which represents the lower one-third of the horizontal frequencies of the input luma signal with a vertical resolution of 96 lines, each line having a duration of 63.56 microseconds (corresponding to an NTSC horizontal line). The 96 lines of component LL are transmitted at a vertical rate of 59.94 Hz. This component, which therefore represents the low horizontal and vertical luma information, carries the bulk of the motion information which can be seen by the human eye, and is therefore sent at a relatively fast update rate.

In the receiver, to be described in detail hereinafter, the 96 lines of component LL received each field are processed by a vertical filter to provide a low frequency luma image on all 720 active lines of the display. This low frequency luma image is, in effect, obtained by interpolating the 96 lines of component LL received each field into 720 lines on the display. The remainder of the vertical detail in the 0-9.6 MHz horizontal band is transmitted as lines of a difference component LD. The transmitted lines of difference component LD are used to update the vertical detail in the low frequency luma image produced in response to component LL on a line-by-line basis during each field of the transmitted five field frame.

The lines of difference component LD are derived in encoder 110 by using a vertical filter 132 identical to the vertical interpolating filter used in the receiver. The input to vertical filter 132 is derived from the output of vertical resampler 126 and thus comprises the non-time-base-expanded 96 lines per field of component LL. Vertical filter 132 interpolates this signal into the same 720 lines per field produced in the receiver for generating the low frequency luma image, and couples these 720 lines to the negative input of a summer 134. An interpolation algorithm is preferably employed wherein weighted representations of the 96 lines are used in deriving the interpolated lines. The positive input of summer 134 is derived from the output of 0–9.6 MHz horizontal filter 118. This signal represents the lower one-third of the horizontal frequencies of the HDTV luma signal, but with full 720 line vertical detail. A delay compensation circuit 136 is interposed between filter 118 and summer 134 to compensate for any delays produced by vertical filter 124 and vertical resampler 126. Summer 134 therefore operates to subtract corresponding lines of the interpolated signal from the full vertical detail signal to produce 720 difference lines per field. Each line represents the difference between the full vertical detail line in the low horizontal frequency band and the corresponding interpolated line developed in the receiver for producing the low frequency luma image. As explained below, the difference lines are transmitted as component LD to periodically update the vertical resolution of the image produced in the receiver in response to the lines of component LL.

The 720 difference lines per field developed at the output of summer 134 are applied to a temporal low pass filter 138 which is used to reduce aliasing components in the difference lines during motion. The output of filter 138 is, in turn, applied to a 1 of 5 multiplexer 140 and therefrom to a 3.6:1 time expander circuit 142. Multiplexer 140 passes 1/5 or 144 of the 720 difference lines developed each field for transmission in an interlaced pattern, 720 of such lines therefore being transmitted in 1/12 second. The interlace pattern for five successive fields may be as shown below in Table 1.

TABLE 1

| Fields | Difference Lines Transmitted |
|---|---|
| 1 | 1, 6, 11, 16 . . . 716 |
| 2 | 3, 8, 13, 18 . . . 718 |
| 3 | 5, 10, 15, 20 . . . 720 |
| 4 | 2, 7, 12, 17 . . . 717 |
| 5 | 4, 9, 14, 19 . . . 719 |

Time expander 142 is similar to time expander 128 and time expands each line provided by multiplexer 140 by a factor of 3.6:1 to develop component LD. At the same time, circuit 142 reduces the horizontal bandwidth of the difference lines by a factor of 3.6:1 to approximately 0–2.7 MHz. The output of circuit 142 is therefore a 0–2.7 MHz horizontal bandwidth difference component LD (see FIG. 23) comprising 144 difference lines per field (or 720 lines every 1/12 second), each line having a duration of 63.56 microseconds. Each field of 144 difference lines of component LD will be used to update the vertical resolution of the low frequency luma image produced in the receiver in response to component LL.

The middle third of the horizontal frequencies, represented by component MH in FIG. 23, are coupled by a second vertical low pass filter 146 to a second vertical resampler circuit 148. Resampler 148 resamples the 720 lines of active video provided each field by filter 146 to 480 lines. Vertical low pass filter 146 has a cut-off frequency corresponding to approximately 240 cycles per picture height for inhibiting the production of aliasing products by circuit 148 during the resampling process.

The 480 lines per field developed at the output of resampler 148, representing the middle third of the horizontal frequencies of the HDTV luma component, are frequency shifted in circuit 150 to 0–9.6 MHz. The frequency shifted lines are then coupled to a second 1 of 5 multiplexer 152 by a second temporal low pass filter 154. As in the case of filter 138, temporal filter 154 is used to reduce aliasing of the MH component during motion. Multiplexer 152 passes 1/5 or 96 of the 480 MH component lines developed by resampler 148 for transmission during each field. The 96 lines of the MH component are also interlaced for transmission in a manner similar to that previously described.

The output of multiplexer 152 is coupled to a time expander circuit 156 which is similar to expanders 128 and 142 and which time expands each line provided by multiplexer 152 by a factor of 3.6:1 (and reduces its horizontal bandwidth by a corresponding factor) to develop the lines of component MH for transmission. The output of expander 156 therefore comprises a 0–2.7 MHz horizontal bandwidth component MH (see FIG. 23) of 96 lines per field (or 480 lines every 1/12 second) representing the vertically filtered middle third of the horizontal frequencies of the HDTV luma component. Due to the vertical filtering and resampling, the static vertical resolution of component MH will be ⅔ that of the low horizontal frequency components LL and LD. Each transmitted field of 96 lines of component MH will be used to update the horizontal and vertical resolution of the low frequency luma image produced in the receiver.

The high third of the horizontal frequencies of the HDTV luma component provided by bandpass filter 122 are processed in similar manner to produce component HH (see FIG. 23) for transmission. The output of filter 122 is coupled by a third vertical low pass filter 158 to a vertical resampler 160. Circuit 160 resamples the 720 active video lines to 240 lines which are frequency shifted to 0–9.6 MHz by a frequency shifting circuit 162. The frequency shifted lines are coupled by a third temporal low pass filter 164 to a third 1 of 5 multiplexer 166 which passes 1/5 or 48 of the 240 lines developed each field in a manner similar to that previously described with respect to the lines of component MH. The 48 lines of component HH will also be interlaced for transmission as previously described. The output of multiplexer 166 is finally time expanded and reduced in horizontal bandwidth by factors of 3.6:1 in expander circuit 168 to develop the lines of component HH for transmission. The horizontal frequencies represented by the 48 lines of component HH transmitted each field will only have ⅓ the static vertical resolution of the low horizontal frequency components.

The net effect of the foregoing is to allow for the transmission of a HDTV luma signal having a 28.9 MHz horizontal bandwidth over a 6 MHz RF channel. This is made possible to a large extent by the transmission of the various components of the luma signal in a temporal manner as described above. The vertical resolution of the luma signal is, however, different for each of the horizontal frequency bands as shown in FIGS. 22 and 23, the low horizontal frequencies having a vertical resolution of 720 lines, the middle frequencies 480 lines and the high frequencies 240 lines. The net effect of these differences is a reduction in diagonal resolution as previously described.

In addition, the transmission is effected such that a predetermined number of lines of each of the components LL, LD, MH and HH will be transmitted during each field. In the case of component LL, all 96 lines are transmitted while a reduced number of lines of components LD (144 of 720), MH (96 of 480) and HH (48 of 240) are transmitted each field. This arrangement allows an updated image to be reproduced by the receiver each field, with the low frequency video information being fully updated each field and the higher frequency information being updated on a partial basis each field and fully updated in a complete frame. Also, since the image reproduced by the receiver is updated on a line-by-line basis each field, the receiver requires the equivalent of only a single frame store.

The color difference components C1 and C2 provided at terminals 114 and 116 respectively of encoder 10 are processed using techniques similar to those used for processing the luma components. The C1 and C2 signals are initially bandlimited to 9.6 MHz by low pass filters 172 and 174 respectively. The bandlimited C1 and C2 signals are then vertically filtered by vertical low pass filters 176 and 178 respectively before being vertically resampled by resamplers 180 and 182. Both signals are resampled from 720 vertical lines to 240 lines and are then filtered by temporal low pass filters 184 and 186 prior to being decimated by a factor of five by one of five multiplexer 188 and 190. Thus, each of the multiplexers 188, 190 passes 48 of the 240 vertically resampled lines produced each field in a manner similar to that previously described with respect to components MH and HH. The outputs of multiplexers 188 and 190 are then applied to a pair of 3.6:1 time expanders 192 and 194. As will be explained in further detail hereinafter, the 480 (240×2) lines of color difference components are transmitted in an interlaced pattern and will be interpolated at the receiver into 720 active lines to provide a smooth color presentation. The color difference resolution will be one third the horizontal and vertical resolution of the transmitted luma components. In comparison, in the horizontal direction, this is 4.48 times NTSC chroma resolution and 0.5 times NTSC chroma resolution in the vertical direction.

As a result of the foregoing encoding, the low horizontal and low vertical frequency luma component LL will be updated every field (i.e. every 1/59.94 seconds) to provide very good motion reproduction where the human eye is most sensitive to movement. Updates for the higher frequency luma components LD, MH and HH, as well as for the color difference components C1 and C2, for which the human eye is less sensitive to movement, will occur on a partial basis every field, but will require an entire frame (five fields or approximately 1/12 second) for a complete update.

The encoding process described herein results in the development of 480 luma and color difference lines which must be transmitted every field (1/59.94 seconds), each line of which has a horizontal bandwidth of 2.7 MHz and a duration of 63.56 microseconds. In particular, 96 lines of component LL, 144 lines of component LD, 96 lines of component MH, 48 lines of component HH and 96 lines of components C1 and C2 must be transmitted every field. In order to maintain compatibility with the existing NTSC line transmission structure, the lines are paired and transmitted on respective quadrature components of a suppressed video carrier approximately centered in a 6 MHz RF channel. Each field can therefore be considered to comprise two sub-fields, each sub-field corresponding to a respective quadrature component of the video carrier. Each sub-field is therefore used to transmit 240 of the 480 HDTV lines, corresponding to 240 active NTSC video lines. On the average, this leaves 22½ NTSC equivalent lines every 1/59.94 seconds for the transmission of audio, timing and sync information during each sub-field.

Figure 24:
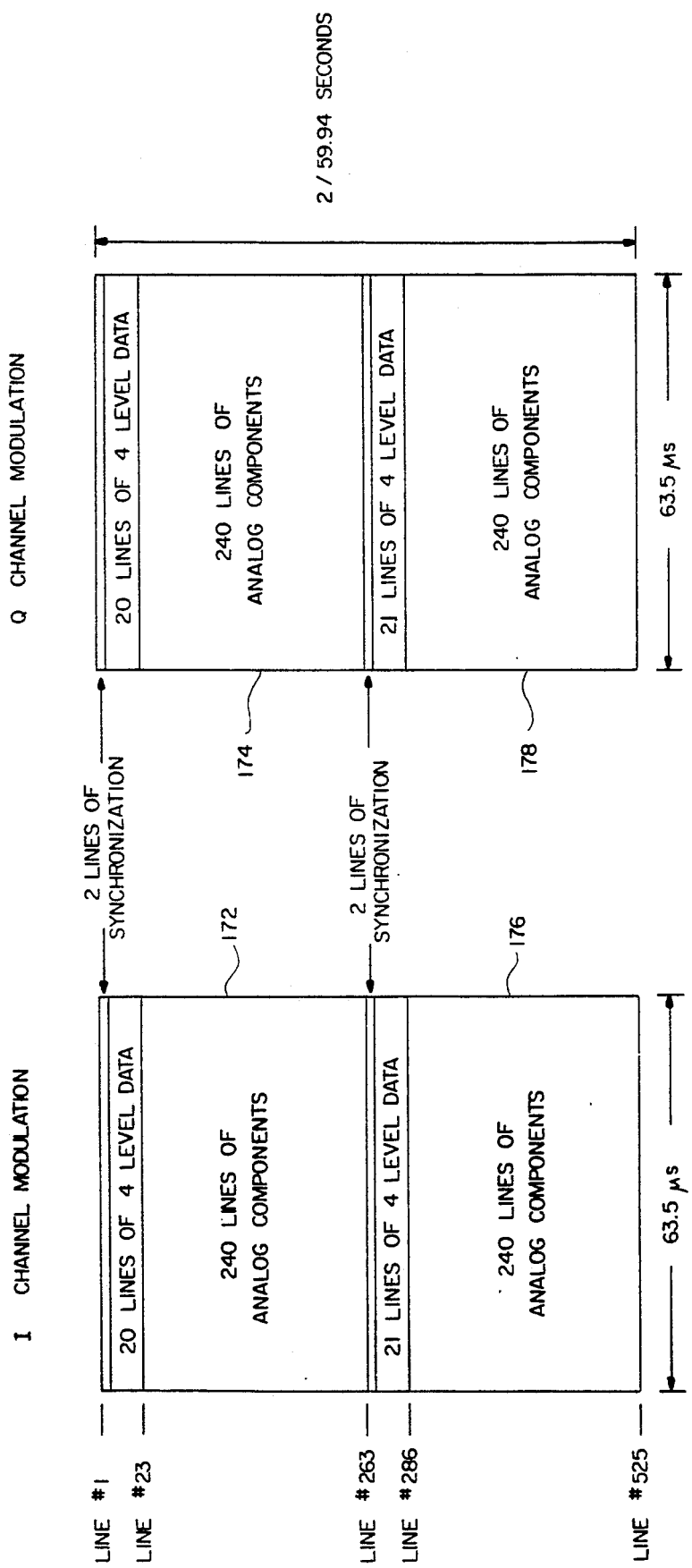
FIG. 24 pictorially illustrates the format in which the encoded video information provided by the encoder of FIG. 21 is transmitted according to the invention.

The structure of the sub-fields is illustrated in FIG. 24. The quadrature components of the video carrier on which the respective sub-fields are modulated are represented by a first column labeled I channel modulation and a second column labeled Q channel modulation. Sub-field 172 of the I channel and corresponding sub-field 174 of the Q channel together represents a first HDTV transmission field pair having a time duration of 1/59.94 seconds. Sub-field 176, transmitted immediately after sub-field 172 on the I channel and sub-field 178 transmitted immediately after sub-field 174 on the Q channel, represent a second HDTV transmission field pair. In addition to the two sets shown, three similar sets of sub-field pairs are sequentially transmitted on the I and Q channels to complete the HDTV transmission frame. It will be observed that the line structure of each sub-field is equivalent to that of an NTSC field, each sub-field comprising 240 lines of luma and color difference HDTV components and, and on the average, 22½ additional lines corresponding to the NTSC vertical blanking interval (VBI). Actually, alternate sub-fields include 22 and 23 VBI lines as illustrated. As mentioned previously, this equivalency facilitates the reduction of interference between NTSC and HDTV co-channels and also makes it easier to transcode an HDTV signal into NTSC format.

The pairing of HDTV lines in corresponding sub-fields is chosen to minimize sensitivity to crosstalk which might occur between the quadrature channels under non-ideal conditions. In a preferred embodiment of the invention, the five line pairing sequence shown in Table 2 is repeated 48 times in each sub-field for a total of 240 lines. It will be observed that this sequence provides for the transmission of 96 lines of component LL, 144 lines of component LD, 96 lines of component MH, 48 lines of component HH and 48 lines of each of components C1 and C2 each field.

TABLE 2

| Line # | I Channel | Q Channel |
|--------|-----------|-----------|
| 1 | LL | LL |
| 2 | LD | LD |
| 3 | LD | MH |
| 4 | MH | HH |
| 5 | C1 | C2 |

Since no synchronizing signals are provided in the transmitted lines of the HDTV components, synchronizing and timing information is provided during the transmitted VBI lines. Thus, two lines of the VBI of each sub-field are reserved for the transmission of a high frequency data clock (340×15.734 KHz), along with a vertical chirp and a horizontal chirp. The data clock establishes the basic timing for the encoder 110 and the decoder in the receiver, while the two chirp signals identify the phases of the clock signal required for deriving appropriate horizontal and vertical deflection signals in the receiver.

Figure 25:
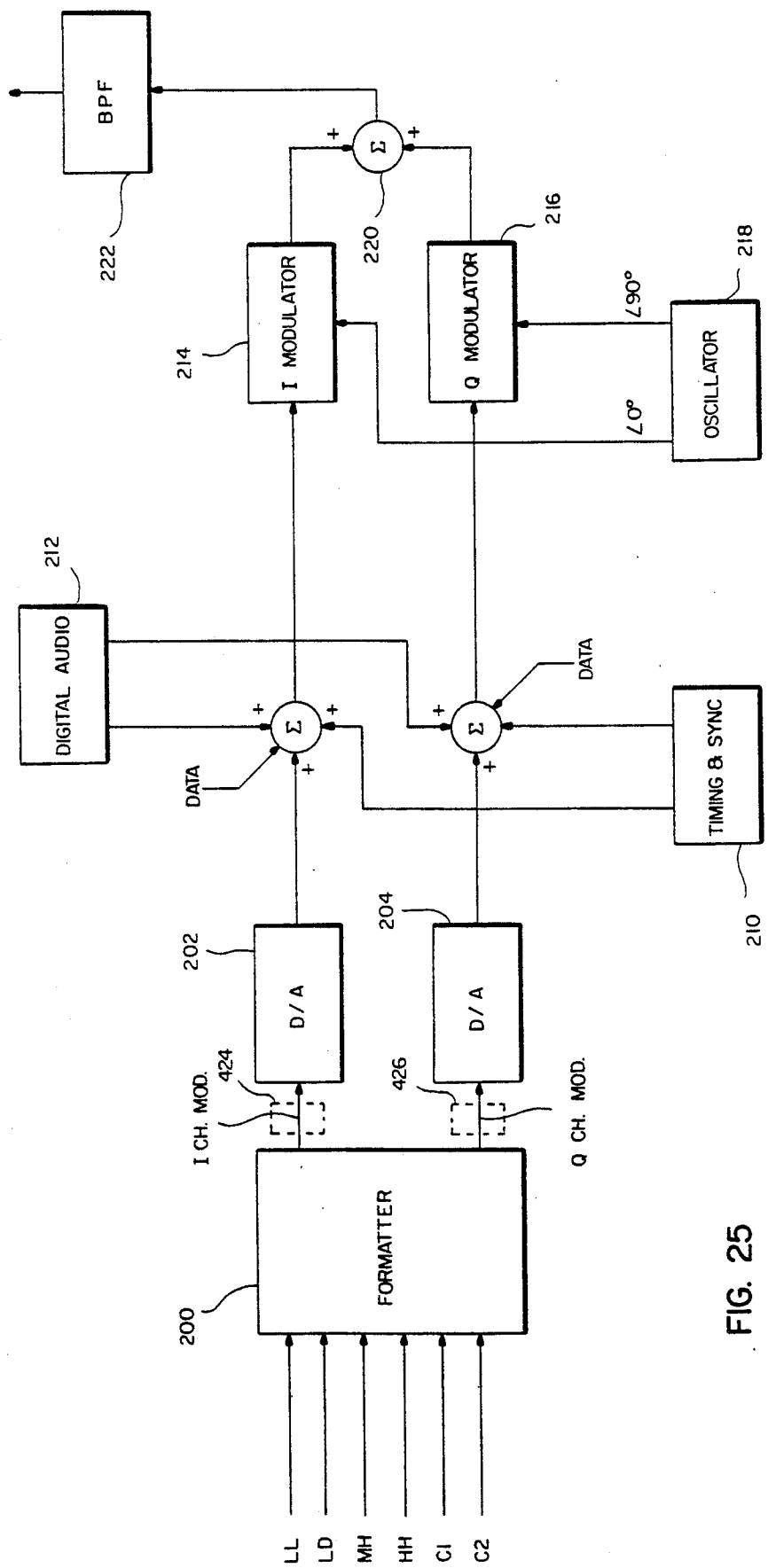
FIG. 25 is a simplified block diagram of a circuit for transmitting the encoded video information provided by the encoder of FIG. 21.

FIG. 25 is a block diagram illustrating the manner by which the luma and color components generated by encoder 110, as well as the related audio, timing and sync information is transmitted according to the invention. As previously described, these signals are transmitted as suppressed carrier amplitude modulation of quadrature components of a picture carrier located in the center of a 6 MHz RF channel. This technique makes optimum use of the 6 MHz channel in an environment subject to interference of various forms including interference caused by NTSC co-channels. The audio, timing and sync information is preferably transmitted during the vertical blanking interval lines of each sub-field (see FIG. 24). Since the line structure of the HDTV transmission format described herein is equivalent to that used for NTSC transmissions, the HDTV vertical blanking interval can be frame locked to coincide with the vertical blanking interval of an existing NTSC channel which is likely to receive interference from the HDTV channel. Since data would be the most visible interference into the NTSC co-channel, frame locking assures that the data will be hidden in the vertical blanking time of the NTSC channel.

With further reference to FIG. 25, the luma components LL, LD, MH and HH together with the color difference components C1 and C2 generated by encoder 110 are coupled to a formatter 200. Formatter 200 appropriately formats the HDTV components into sub-fields as illustrated in FIG. 24 (see also Tables 1 and 2) for providing an I channel modulation output and a Q channel modulation output. The two outputs of formatter 200 are converted to analog signals by D/A converters 202 and 204 and then coupled to inputs of respective summers 206 and 208. Both summers also receive inputs from a timing and synch source 210 and from a digital audio source 212 for inclusion in the VBI lines of the respective sub-fields. The outputs of the summers are coupled to an I modulator 214 and a Q modulator 216 for transmission. An oscillator 218 provides an in-phase carrier to I modulator 214 and a quadrature carrier to Q modulator 216. Quadrature modulators 214 and 216 provide RF outputs at the same picture carrier frequency, but 90 degrees different in phase. The two RF outputs are combined in a summer 220 and passed to a bandpass filter 222 for filtering and waveshapping prior to transmission.

Figure 26:
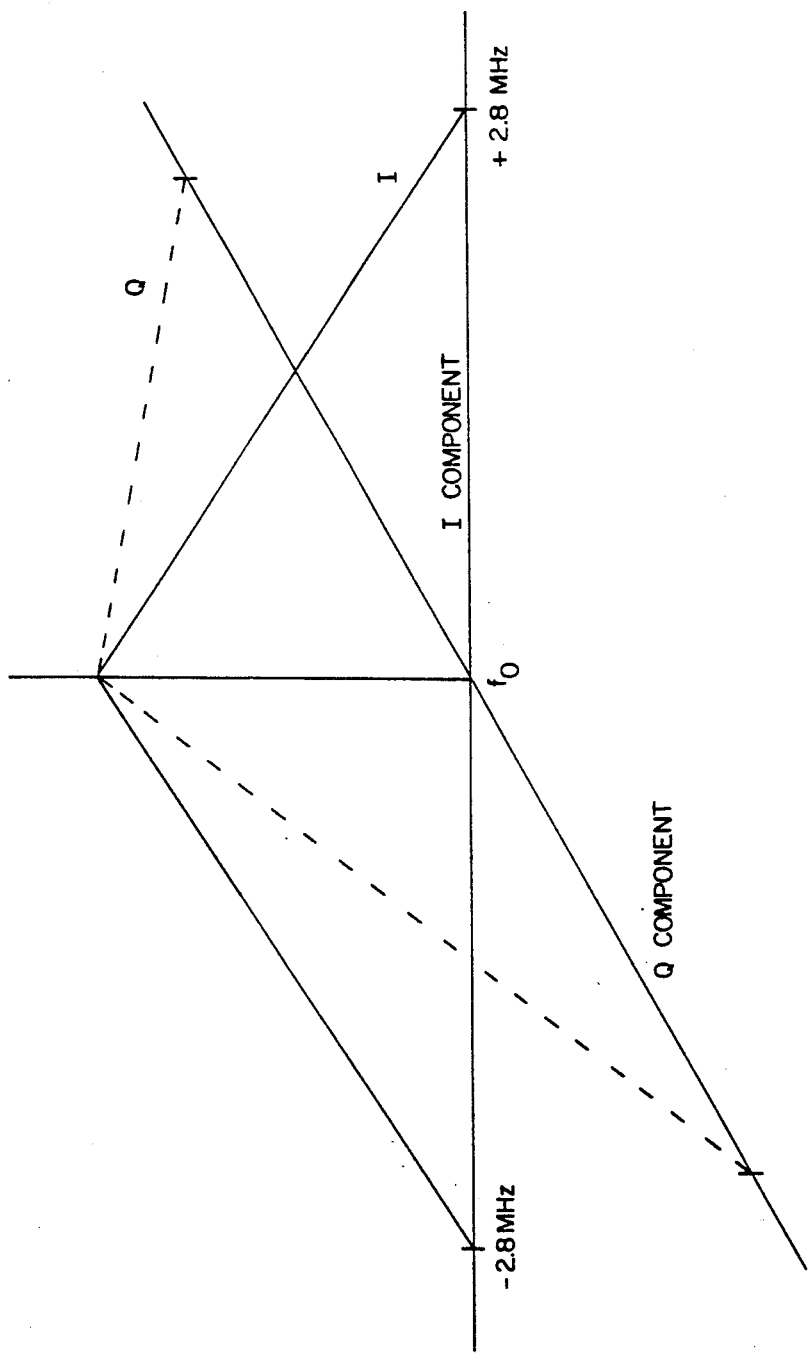
FIG. 26 graphically depicts the manner in which the transmission circuit of FIG. 25 modulates an RF carrier.
Figure 27:
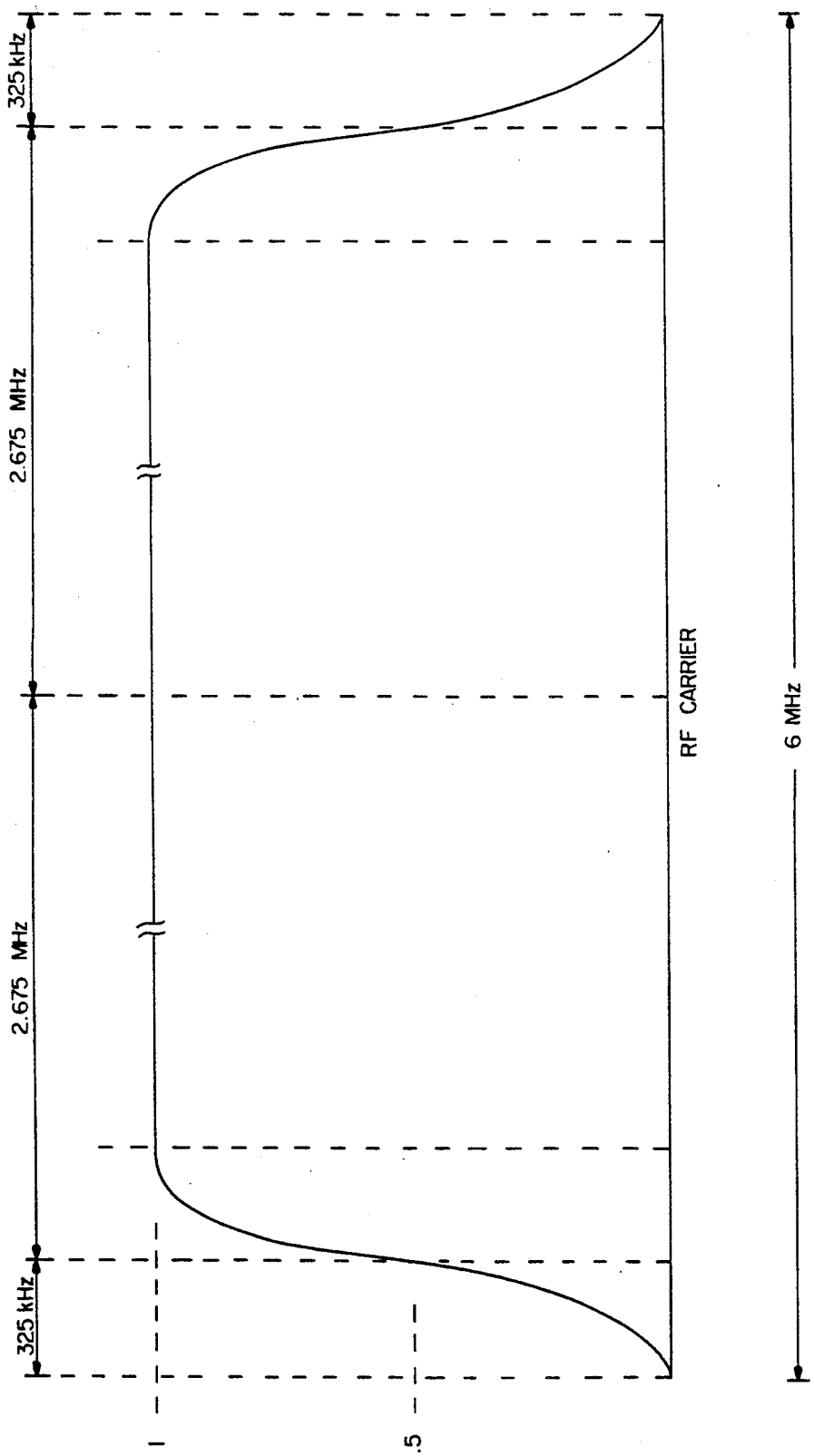
FIG. 27 graphically illustrates the channel shape used to transmit an HDTV signal according to the invention.

The resulting quadrature modulation of the 6 MHz RF channel is illustrated in FIG. 26, where f0 is the frequency of the suppressed video carrier in the center of the channel. The overall channel shape is shown in FIG. 27. It will be observed that the channel is flat for 2.35 MHz on either side of the carrier frequency and then drops off with a Nyquist slope centered about 2.675 MHz (170×15.734 KHz) from the carrier frequency. The Nyquist slope is therefore centered about one-half the bit clock rate of 340×15.734 KHz. This overall channel shape, which must have a linear phase response, provides good transition regions while maximizing the data rate and minimizing intersymbol interference. The overall bandwidth, including the Nyquist transition regions, is plus or minus 3.0 MHz from the carrier frequency. In order to achieve the channel shape illustrated in FIG. 27, bandshaping is preferably split between the transmitter and the receiver such that the receiver can have a "haystack" type response centered about the video carrier. The "haystack" receiver response allows the simplest and most economical filter design in the receiver with excellent adjacent channel rejection. The transmitter bandshaping is provided by bandpass filter 222 shown in FIG. 25.

Figure 28:
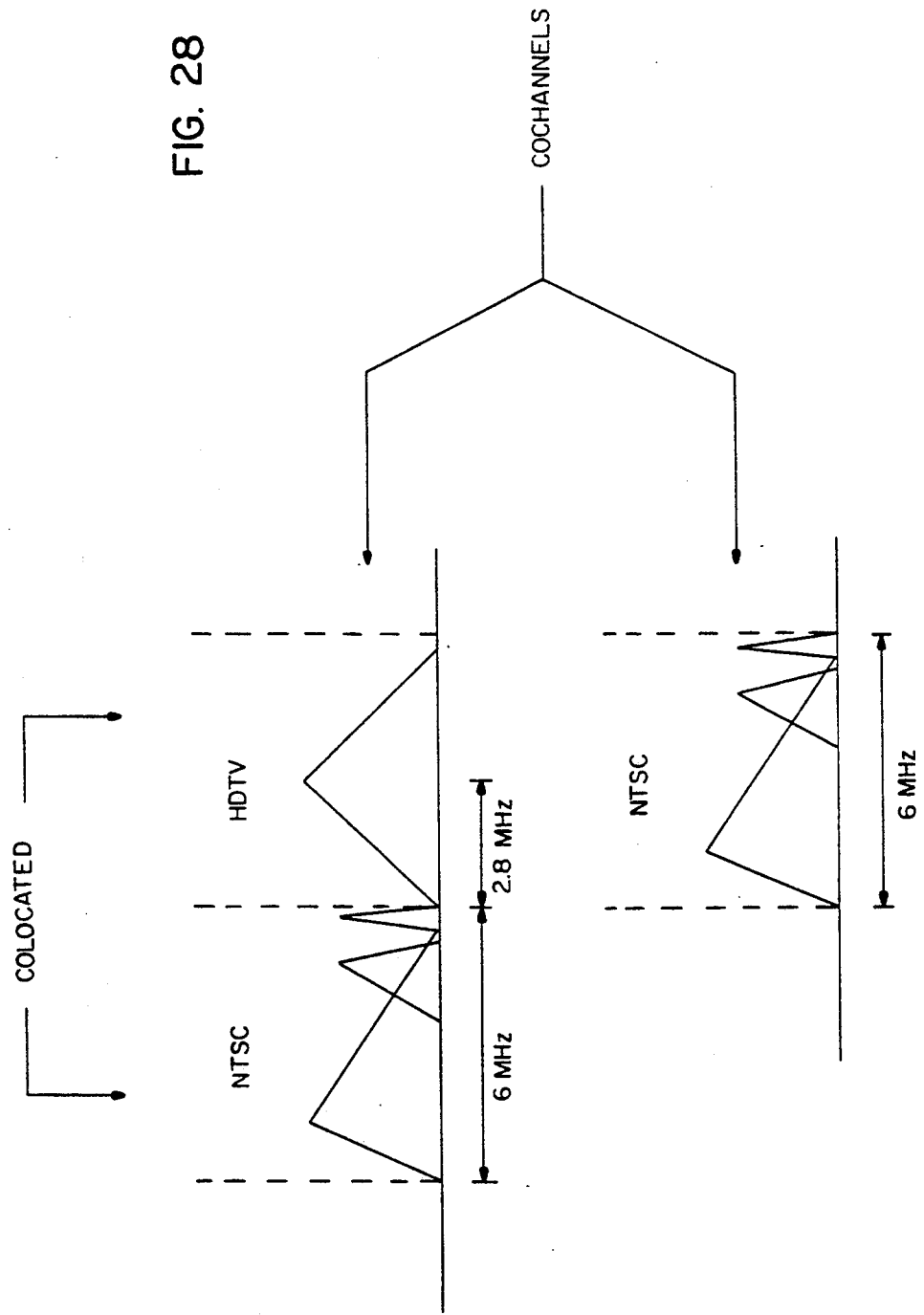
FIG. 28 graphically illustrates an HDTV transmission according to the invention in relation to adjacent and co-channel NTSC transmissions.

The spectrum of the HDTV channel in relation to the NTSC channels around it is shown in FIG. 28. It will be seen that the placement of the HDTV carrier is offset slightly from the center of the channel in order to avoid the co-channel sound carrier. This offset permits the HDTV receiver to incorporate a sound trap to eliminate the interference. Collocation with adjacent NTSC channels is preferred to avoid adjacent channel overload.

Figure 29:
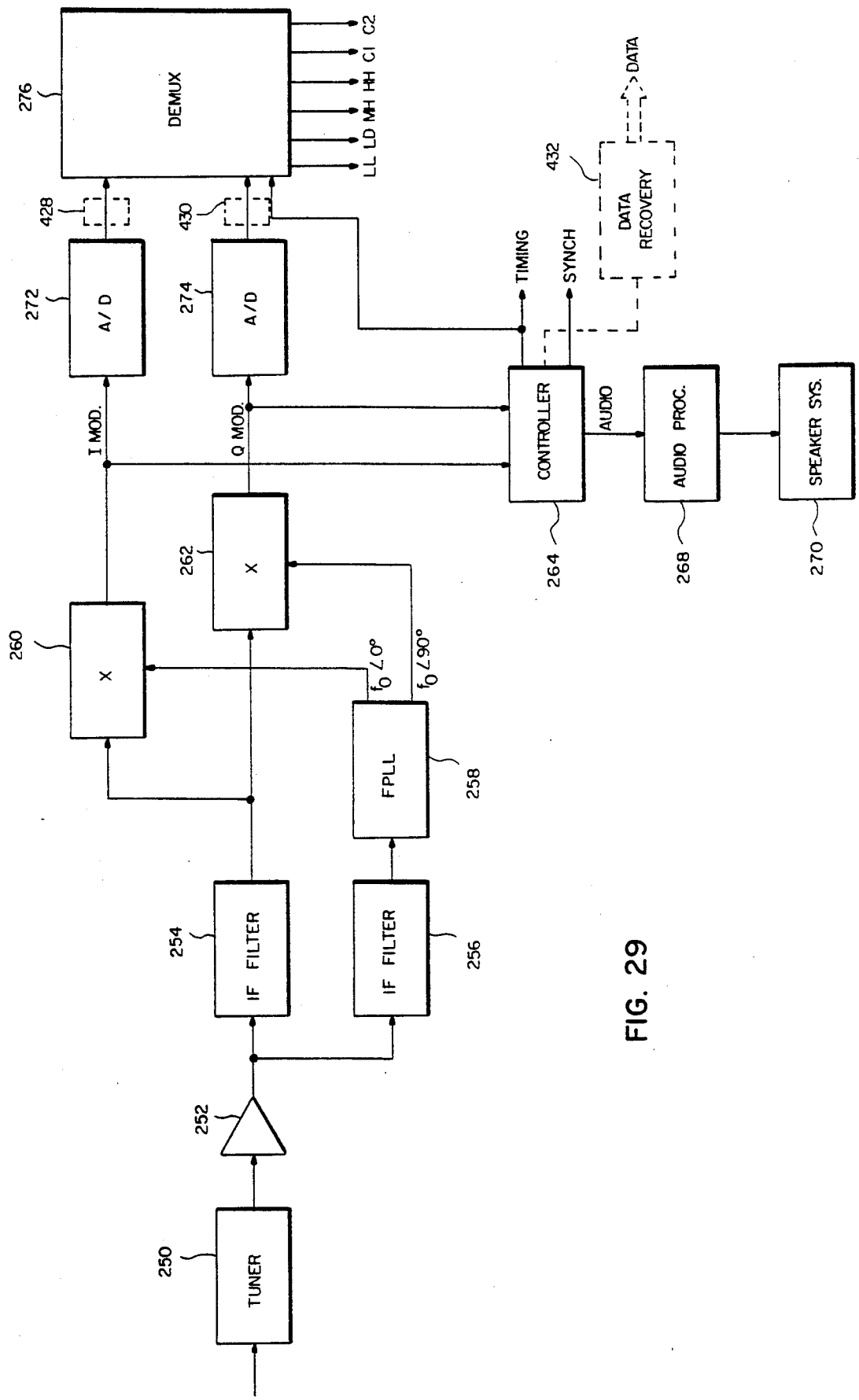

FIGS. 29 and 30 illustrate an HDTV receiver for receiving, decoding and displaying the HDTV signal transmitted as previously described. Referring initially to FIG. 29, the received HDTV signal is applied to a tuner 250 which selects and translates the received signal to a predetermined intermediate frequency (IF) signal. The IF output signal of tuner 250 is coupled by an amplifier 252 to the inputs of a pair of IF filters 254 and 256. The output of IF filter 256 is applied to a frequency and phase locked loop (FPLL) 258, which is preferably of the type disclosed in U.S. Pat. No. 4,072,909. FPLL 258 develops a pair of output carrier signals at the intermediate frequency, one output comprising an in-phase component and the other a quadrature component. The in-phase component is coupled to one input of a first multiplier 260 and the quadrature component is coupled to one input of a second multiplier 262. The output of IF filter 254 is applied to the other inputs of multipliers 260 and 262, which function to demodulate and thereby recover the I and Q channel modulation respectively of the received signal.

The I and Q channel modulation signals recovered at the outputs of multipliers 260 and 262 are applied to a controller circuit 264. Controller 264 recovers the digital information transmitted in the VBI of each sub-field for developing an output timing signal, an output synch signal and an output audio signal. It will be recalled that the VBI of each transmitted sub-field includes a high frequency data clock, a vertical chirp and a horizontal chirp. The data clock establishes the basic timing for operation of the receiver, with the two chirp signals identifying the clock phases required for deriving appropriate vertical and horizontal synch signals. The synch signals are thus derived by counting the data clock beginning with the clock phases identified by the respective chirp signals. As will be described in further detail, the derived horizontal and vertical synch signals are coupled to a CRT 266 (see FIG. 30) for controlling the deflection of one or more electron beams for facilitating reproduction of the received HDTV image. As previously described, the derived synch signals will establish a vertical deflection rate of 59.94 Hz (identical to NTSC) and a horizontal deflection rate of 47.2 KHz (three times NTSC). The audio output developed by controller 264 is applied to an audio processor 268 for processing the audio information for reproduction by a suitable speaker system 270.

The I and Q channel modulation signals recovered at the outputs of multipliers 260 and 262 respectively are also coupled to a pair of analog-to-digital converters 272 and 274 which convert the received analog lines of video information to corresponding digital signals. Each of the converters 272 and 274 therefore provides 240 lines of digital video information at a rate of 59.94

Hz. This digital video information is applied to a demultiplexer 276 which, in response to a timing signal from controller 264, separates the luma and color difference lines received each field and, provides the separated lines of video information at corresponding outputs LL, LD, MH, HH, C1 and C2. These outputs, together with the timing and synch signals provided by controller 164, are coupled to the video decoder of FIG. 30 for reproducing the transmitted HDTV video image.

Referring to FIG. 30, the 96 lines per field of video component LL developed at the output of demultiplexer 276 are coupled to a vertical filter 280 which is identical to vertical filter 132 in encoder 110. Filter 280, in response to a timing signal from controller 264, converts the 96 lines of component LL received each field to 720 lines using the same conversion algorithm used by filter 132. At the same time, the 720 lines are time compressed by a factor of 3.6:1. This allows for appropriate retrace blanking levels to be inserted in each of the lines consistent with the deflection signals applied to CRT 266. As previously mentioned, the conversion algorithm may employ a technique whereby weighted representations of the received lines are employed in deriving the interpolated lines. The output of vertical filter 280, which comprises 720 lines of component LL at a rate of 59.94 Hz, is applied to a first input of a summer 292.

The lines of video information comprising components LD, MH, HH, C1 and C2 developed at the output of demultiplexer 276 are coupled to respective memories 282, 284, 286, 288 and 290. Cumulatively, memories 282-290 provide sufficient memory for storing one complete frame of the received HDTV signal. In particular, memory 282 comprises a 720 line memory capable of storing the 720 interlaced lines of component LD received each 1/12 second. As previously described, 144 of these lines are received each field of the transmitted signal (159.94 seconds) in an interlaced pattern. The received video lines are stored in corresponding lines of the memory with 1/5 of the memory being updated every 1/59.94 seconds and the entire memory every 1/12 second. While the lines of component LD are written into memory 282 at the rate of 144 lines/59.94 seconds, they are read out of the memory in a non-destructive manner at the rate of 720 lines/59.94 seconds. On an individual basis, each line is read out of memory 282 3.6 times faster than it is read into the memory. As before, this compresses each line by an appropriate factor to allow for insertion of retrace blanking signals consistent with the horizontal and vertical deflection rates at which CRT 266 is operated. The 720 time compressed lines read out of memory 282 are coupled to a second input of summer 292.

Memory 284 comprises a 480 line memory capable of storing the 480 interlaced lines of component MH received each 1/12 second. As previously described, 96 of these lines are received each field of the transmitted signal in an interlaced pattern. The received video lines are stored in corresponding lines of the memory with 1/5 of the memory being updated every 1/59.94 seconds and the entire memory every 1/12 second. The stored video information is non-destructively read out of memory 284 at the rate of 480 lines/59.94 seconds, with each individual line being read out 3.6 times faster than it is read into the memory. As previously explained, each video line read out of the memory is therefore time compressed by a factor of 3.6:1 to allow for insertion of blanking levels consistent with the deflection rate at which CRT 266 is operated.

The time compressed lines of video information read out of memory 284 are coupled to a frequency shifting network 294 and therefrom to a vertical filter 296. Frequency shifting network 294 translates the video information to the frequency band 9.6-19.3 MHz corresponding to the middle one-third of the luma horizontal frequencies. The frequency shifted lines of component MH are then filtered in vertical filter 296 to provide 720 lines/59.94 seconds, which are coupled to a third input of summer 292.

The video lines comprising component HH are processed in a similar manner. Thus, the 48 lines received each field are stored in 240 line memory 286 with 1/5 of the memory being updated every 1/59.94 seconds and the entire memory every 1/12 second. The stored video information is non-destructively read out of the memory at a rate of 240 lines/59.94 seconds, each individual line being read out 3.6 times faster than it is read into the memory and providing a corresponding time compression. The output of the memory is coupled to a second frequency shifting network 298 which translates the video information to the frequency band 19.3-28.9 MHz corresponding to the high one-third of the luma horizontal frequencies. The frequency shifted lines of component HH are then filtered in a vertical filter 300 to provide 720 lines/59.94 seconds, which are coupled to a fourth input of summer 292.

Summer 292 thus serves to reconstruct the HDTV luma signal by summing corresponding ones of the 720 lines of each of the LL, LD, MH and HH components applied thereto every 1/59.94 seconds. The reconstructed luma signal therefore represents all of the horizontal frequencies of the HDTV luma source signal provided at input terminal 112 of encoder 110 with reduced diagonal resolution. The signal includes 720 lines of active video presented for display at a frame refresh rate of 59.94 Hz. In order to provide appropriate retrace blanking intervals, the reconstructed luma signal is applied to a blanking signal insert circuit 302, which also receives a timing input from controller 264. Blanking insert circuit 302 inserts appropriate horizontal and vertical retrace blanking levels into the reconstructed luma signal. Thus, a blanking level occupying about 1/6 of each line is provided for horizontal retrace, vertical retrace being accommodated by providing a blanking level for the 67.5 VBI lines. The output of blanking circuit 302 is then applied to a matrix 304, which also receives the reconstructed color difference signals C1 and C2 to provide output R, G and B signals. The R, G and B signals are converted to an analog form by a D/A converter 306 and then coupled to CRT 266 for display. As previously mentioned, the display will comprise 720 lines of active video reproduced at a horizontal deflection rate of 47.2 KHz (three times NTSC) and at a frame rate of 59.94 Hz (equal to the NTSC field rate). The frequencies represented by the LL component of the luma signal are updated each display frame while 1/5 of the remaining luma frequencies are updated at the display frame rate and fully over five successive display frames.

The lines of color difference components C1 and C2 are reconstructed in a manner similar to that described in connection with the luma components. Thus, the 48 lines of each of components C1 and C2 received each field in an interlaced pattern are stored in respective memories 288 and 290, with 1/5 of each memory being updated every 1/59.94 seconds and the entire memories every 1/12 second. The stored color information is non-destructively read out of the memories at a rate of 240 lines/59.94 seconds, each individual line again being read out of memory 3.6 times faster than it is read in to provide a corresponding time compression. The outputs of memories 288 and 290 are then filtered by respective vertical filters 308 and 310, each providing 720 lines of color difference signals every 1/59.94 second. The vertically filtered color difference lines are finally coupled to matrix 304 through respective "0" level insert circuits 312 and 314. Circuits 312 and 314 insert "0" level signals into the color difference lines corresponding to the blanking levels inserted in the reconstructed luma signal.

The encoding and transmission systems described above may be conveniently combined to form an integrated television system. This combination may, for example, take the form illustrated by the dotted line elements shown in FIGS. 21, 25, 29 and 30. Referring initially to FIG. 21, respective low frequency removal units 400-410 are provided for processing each of the components LL, LD, MH, HH, C1 and C2 developed by encoder 110. Each of the low frequency removal units is constructed as previously described (see FIGS. 1A-15) and provides a data output representing the low frequency portion of the associated component. Preferably, the lower 200 KHz portion of the LL component is removed by unit 400 while only the lower 15 KHz portions of the remaining components are removed by units 402-410. The data signals from the low frequency removal units are coupled to summers 206 and 208 of FIG. 25 for transmission.

The output of each low frequency removal unit is coupled to respective temporal filters 412-422 constructed as shown in FIG. 17. The value of "a" for the amplifier of the temporal filter 412 associated with component LL preferably has a value of 0.75 while the values of "a" of the amplifiers for the remaining filters 414-422 are all 0.50. In an alternative embodiment, the temporal filters 414-422 associated with components LD, MH, HH, C1 and C2 may be combined with respective temporal LPF's 138, 154, 164, 184 and 186.

Referring to FIG. 25, each of the I and Q channel modulation outputs of formatter 200 includes a processing unit 424, 426 for effecting the compression, time dispersion and pre-emphasis functions as illustrated in the transmitter portion of FIG. 16. Corresponding processing units 428, 430 are shown in the receiver of FIG. 29 connected to the outputs of A/D converters 172 and 174. These processing units effect the complementary de-emphasis, time dispersion and expansion functions as illustrated in the receiver portion of FIG. 16. A data recovery circuit 432 is also provided in the receiver of FIG. 29 for recovering the low frequency data provided by the low frequency removal units of FIG. 21.

Referring now to FIG. 30, the recovered low frequency data is applied to a plurality of low frequency restoration units 434-444, one such unit being provided for each video component. The low frequency restoration units restore the low frequencies of each component as previously described. FIG. 30 also includes the necessary temporal de-emphasis filters constructed as shown in FIG. 18, one such filter being provided for each component. The delay for each filter is provided by a respective memory 280-290, each filter further including a respective amplifier 446-456 and a respective summer 458-468 connected as shown. The amplifier 446 for the filter associated with component LL has a coefficient ("a") of 0.75 while the remaining amplifiers 448-456 have coefficients ("a") of 0.50.

The transmission systems and methods and encoding methods described are not to be considered limiting of the broad aspects of the invention. It is recognized that numerous modifications in the described embodiments of the invention may be made by those skilled in the art without departure from its true spirit and scope. The invention is to be limited only as defined in the claims.

What is claimed is:

1. In an environment in which pre-existing NTSC or other standard television signals are transmitted and received in a source locale on standard allocated television channels mutually separated from one another by one or more empty taboo channels to prevent adjacent channel interference and staggered with respect to channel allocations in neighboring locales to prevent co-channel interference therebetween, a spectrum compatible method of transmitting and receiving high definition, wideband television signals simultaneously with said standard television signals, comprising:

deriving wide-band high definition television source signals and encoding said source signals to form encoded non-compatible high definition television signals with standard channel bandwidth;

transmitting in said source locale said encoded high definition television signals in at least a partially digital form on RF carriers for said taboo channels at relatively low power levels so as to minimize interference with adjacent channels in said source locale and co-channels in said neighboring locale; and receiving in said source locale said transmitted high definition signals and reproducing a representation of said source signals in response thereto.

2. The method of claim 1 wherein said encoding step comprises:

developing a first signal representing low power, high frequency components of said source signal;

developing a second signal comprising digitally coded representations of high power, low frequency components of said source signal; and combining said first and second signals for transmission on a single carrier frequency.

3. The method of claim 1 including precisely offsetting the carrier frequency used to transmit said high definition television signal relative to the carrier frequency of a co-channel transmission in said neighboring locale.

4. The method of claim 1 wherein said standard television signals and said encoded high definition television signals have substantially equal vertical periodicities and including locking the vertical rates of said standard and high definition signals in phase with each other such that their respective vertical retrace intervals occur in substantial time coincidence.

* * * * *